(12) United States Patent
Saadat

(10) Patent No.: US 9,550,297 B2
(45) Date of Patent: Jan. 24, 2017

(54) MODULAR GRIPPING MECHANISM FOR HEAVY LOADS

(76) Inventor: M. Mohsen Saadat, Soest (DE)

(*) Notice: Subject to any disclaimer, the term of this patent is extended or adjusted under 35 U.S.C. 154(b) by 0 days.

(21) Appl. No.: 14/233,741

(22) PCT Filed: Jul. 19, 2012

(86) PCT No.: PCT/DE2012/000735
§ 371 (c)(1),
(2), (4) Date: Jan. 17, 2014

(87) PCT Pub. No.: WO2013/010532
PCT Pub. Date: Jan. 24, 2013

(65) Prior Publication Data
US 2014/0159406 A1    Jun. 12, 2014

(30) Foreign Application Priority Data

Jul. 20, 2011 (DE) .................. 10 2011 108 148

(51) Int. Cl.
| B25J 15/08 | (2006.01) |
| B25J 15/00 | (2006.01) |
| B25J 15/02 | (2006.01) |

(52) U.S. Cl.
CPC ......... B25J 15/0028 (2013.01); B25J 15/0253 (2013.01); B25J 15/086 (2013.01)

(58) Field of Classification Search
CPC .................................................... B25J 15/0028
USPC . 294/86.4, 192, 103.1, 119.1, 907; 414/729, 730, 741, 751.1; 901/36–39
See application file for complete search history.

(56) References Cited

U.S. PATENT DOCUMENTS

| 4,336,926 A | * | 6/1982 | Inagaki | B25J 15/0286 269/218 |
| 4,579,380 A | * | 4/1986 | Zaremsky | B25J 13/082 294/119.1 |
| 4,852,928 A | * | 8/1989 | Monforte | B25J 13/082 294/119.1 |
| 5,050,919 A | * | 9/1991 | Yakou | B25J 15/026 294/119.1 |
| 5,056,844 A | * | 10/1991 | Takabayashi | B23P 19/006 29/741 |

(Continued)

FOREIGN PATENT DOCUMENTS

| DE | 4206708 A1 | 9/1993 |
| DE | 4411319 C1 | 6/1995 |

(Continued)

*Primary Examiner* — Paul T Chin
(74) *Attorney, Agent, or Firm* — McNeely, Hare & War LLP; James E Mrose

(57) ABSTRACT

A modularly-structured gripping mechanism for robots, machines, and handling devices comprises at least one movable gripping finger that sits directly or indirectly on a finger module and works counter to a stationary or movable finger. The finger module consists of a slide unit that comprises a housing and a slide made from an aluminum section which is hollow all the way through and has multiple bore holes. The housing consists of a frame and multiple rods which extend parallel to one another, between the end faces, and prestress all parts of the housing. The rods simultaneously function as guide rods for the slides. A very stable gripping mechanism for heavy loads is produced by form-fittingly mounting any number of finger modules on a flange case. The finger modules can have their own drive or can share one drive.

29 Claims, 26 Drawing Sheets

(56) References Cited

U.S. PATENT DOCUMENTS

| | | | | |
|---|---|---|---|---|
| 5,150,937 A * | 9/1992 | Yakou | ............... | B25J 9/1612 |
| | | | | 294/119.1 |
| 5,161,847 A * | 11/1992 | Yakou | ............... | B25J 15/103 |
| | | | | 294/119.1 |
| 5,484,181 A * | 1/1996 | Saadat | ............... | B25J 9/144 |
| | | | | 294/115 |
| 5,609,381 A | 3/1997 | Thom et al. | | |
| 6,010,171 A * | 1/2000 | Margiottiello | ............... | 294/94 |
| 6,264,419 B1 * | 7/2001 | Schinzel | ............... | B25J 9/023 |
| | | | | 294/119.1 |
| 7,490,881 B2 * | 2/2009 | Null | ............... | B25B 1/18 |
| | | | | 294/119.1 |
| 7,918,149 B1 * | 4/2011 | Bertini | ............... | B23Q 1/25 |
| | | | | 82/132 |
| 8,585,113 B2 * | 11/2013 | Maffeis | ............... | 294/192 |
| 2009/0245993 A1 * | 10/2009 | Yeh | ............... | 414/751.1 |

FOREIGN PATENT DOCUMENTS

| | | |
|---|---|---|
| DE | 4413342 A1 | 10/1995 |
| WO | WO-2006/034238 A2 | 3/2006 |

\* cited by examiner

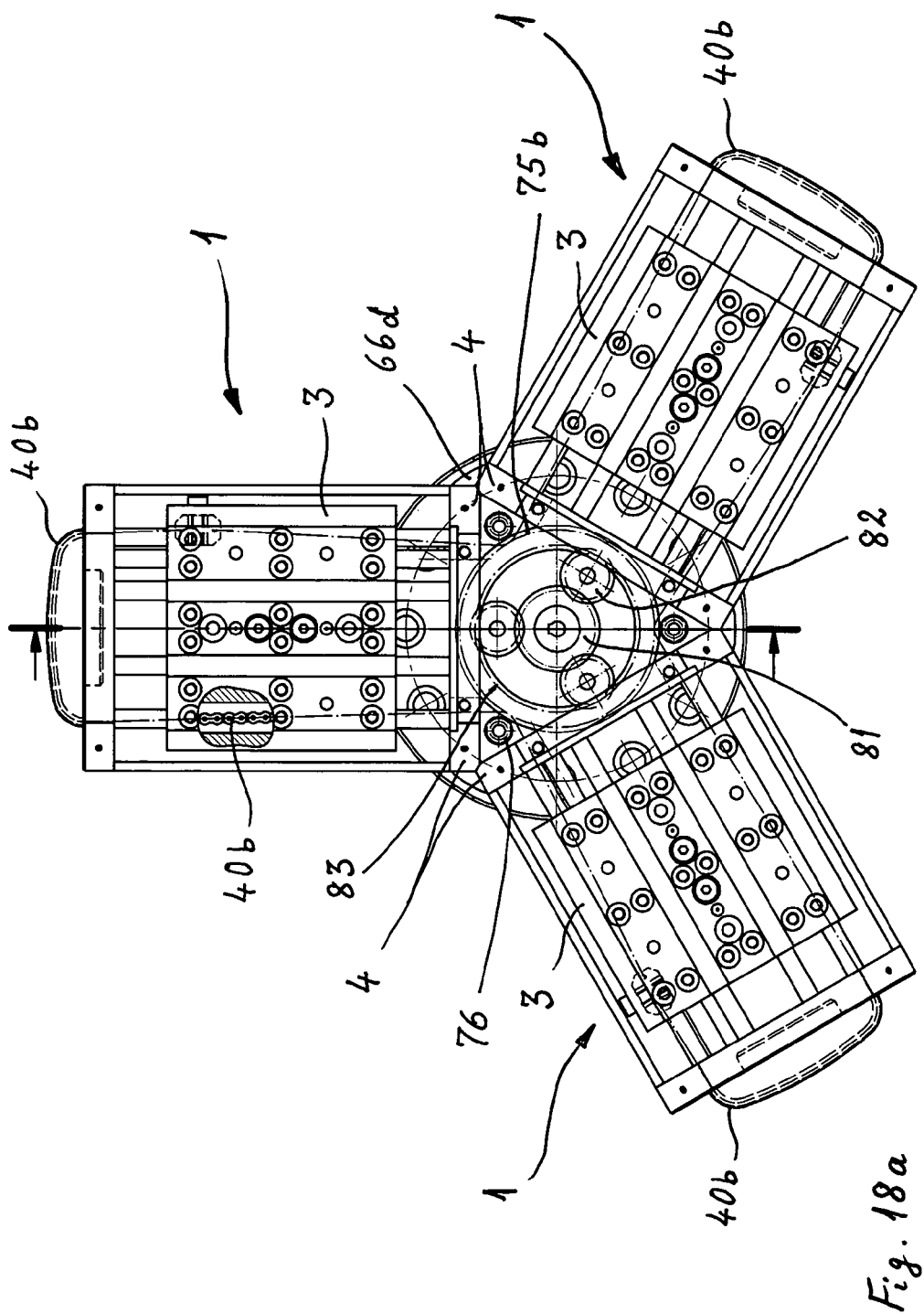

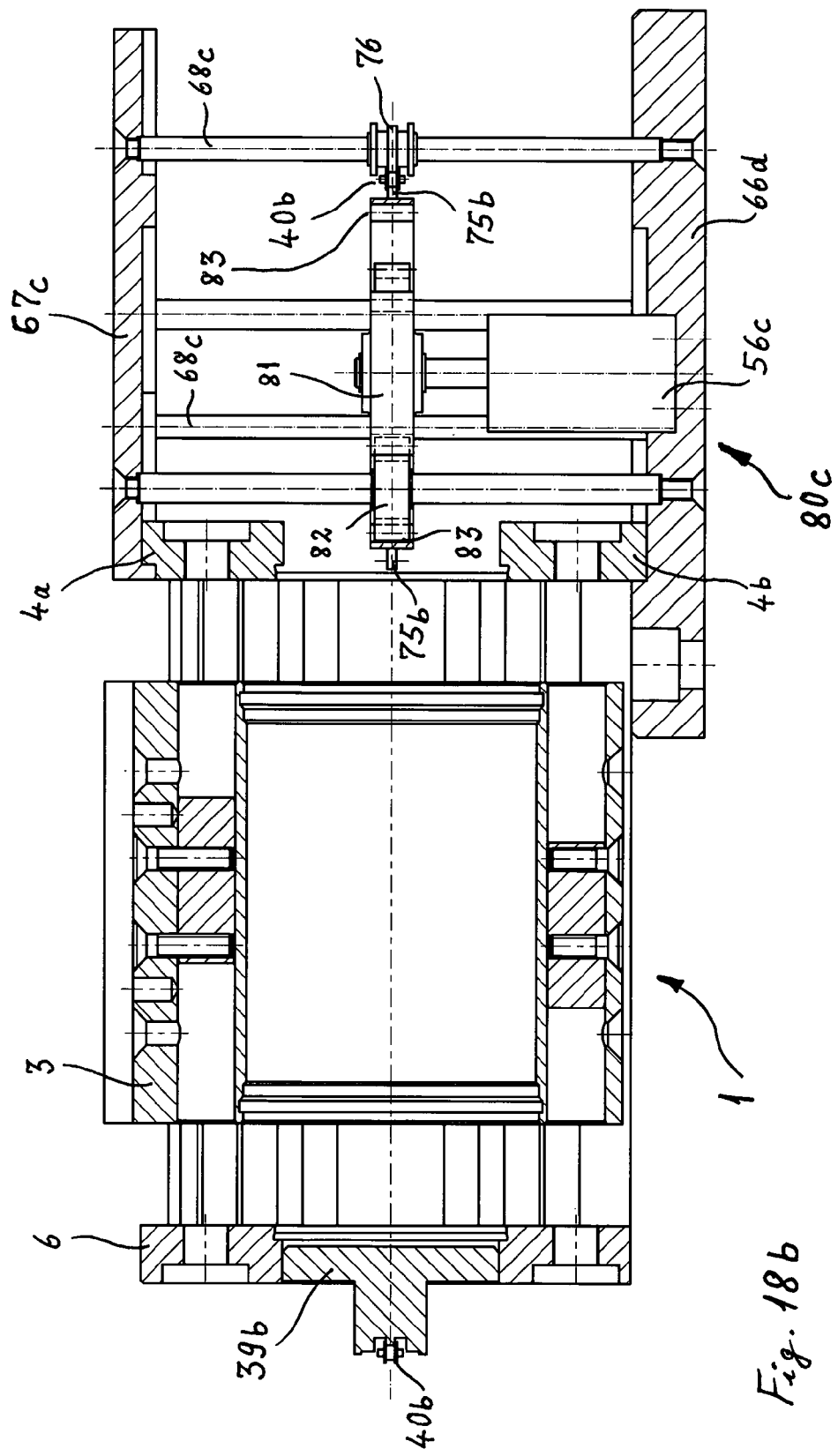

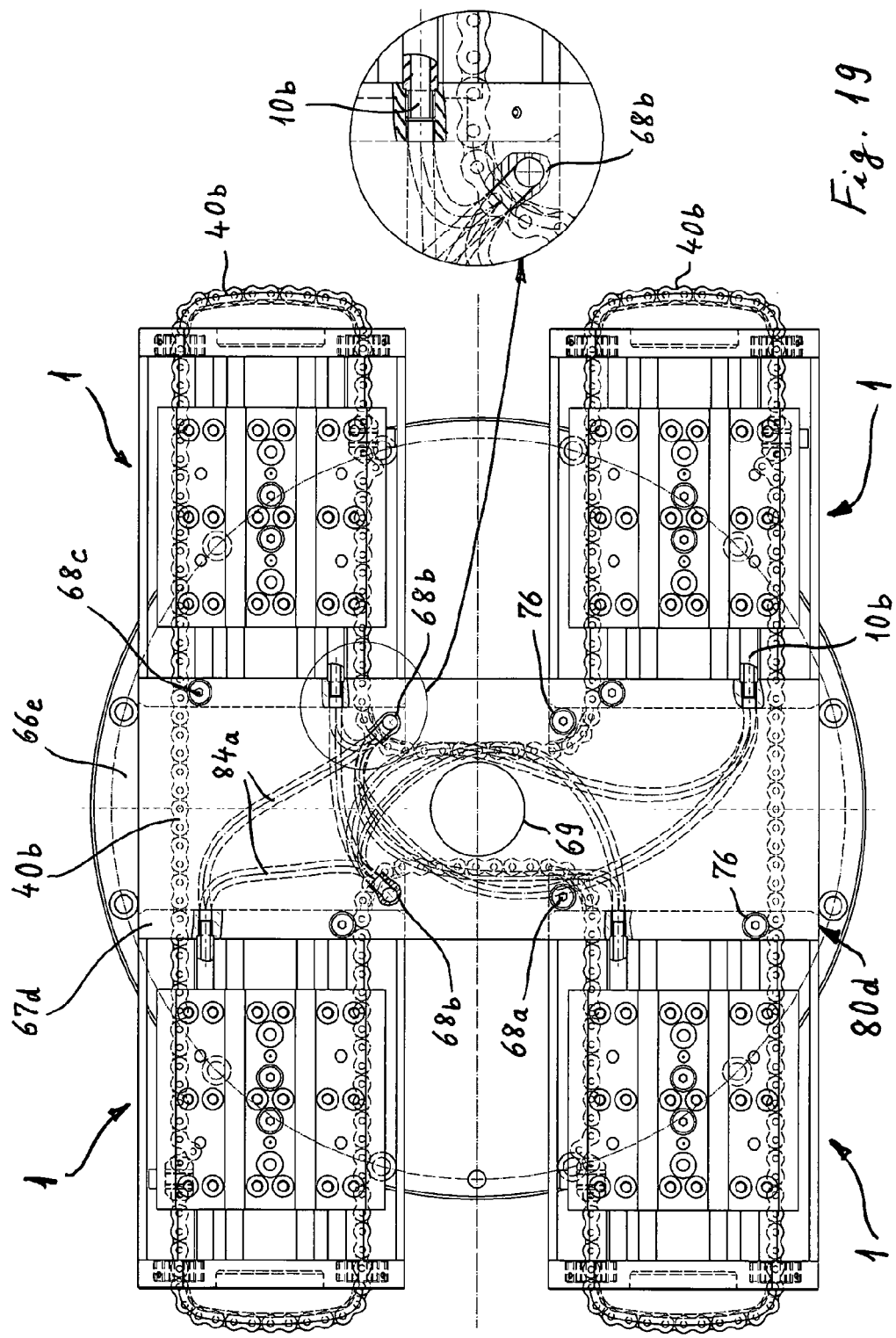

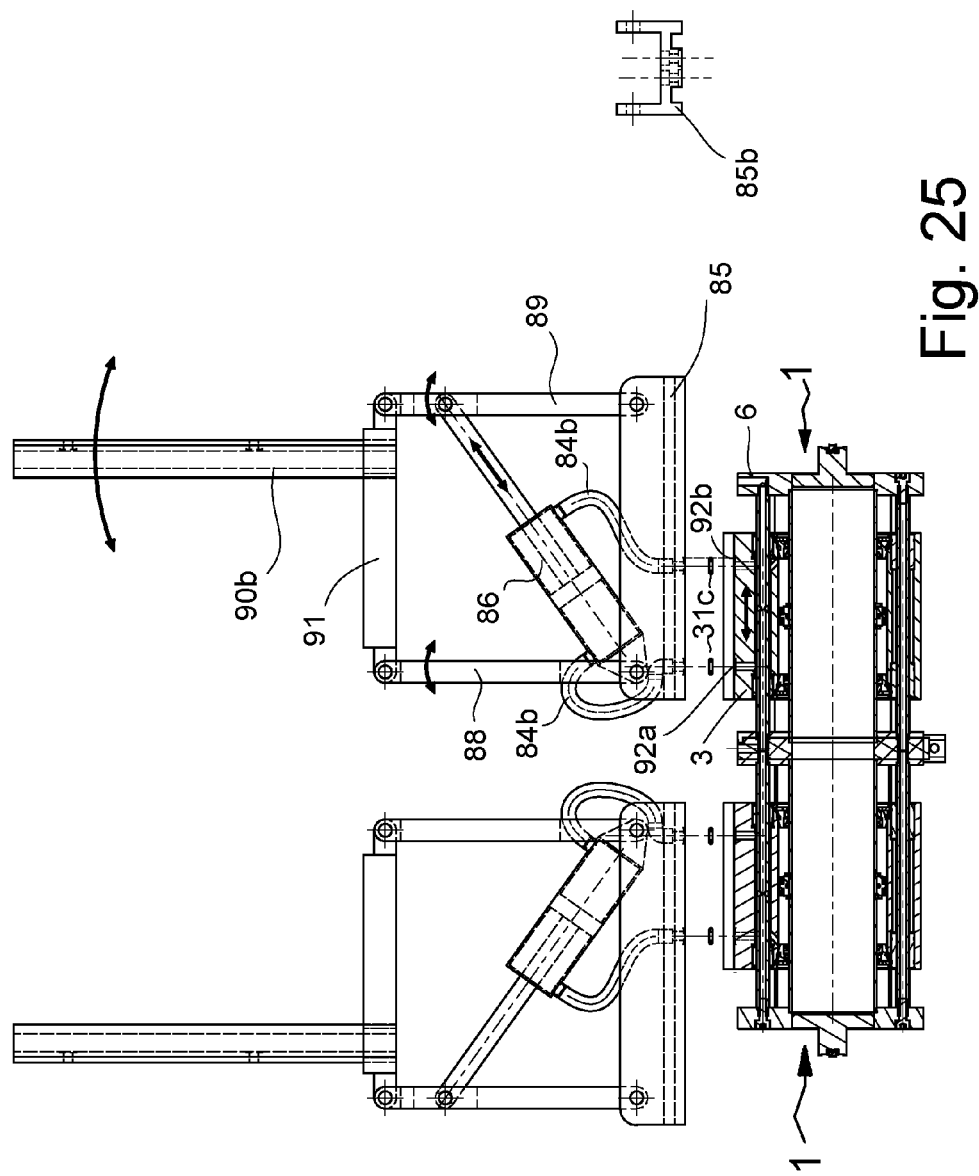

MODULAR GRIPPING MECHANISM FOR HEAVY LOADS

CROSS-REFERENCE TO RELATED APPLICATIONS

This application is a U.S. national phase application under 35 U.S.C. 371 based upon International Application No. PCT/DE2012/000735, filed Jul. 19, 2012, and published Jan. 24, 2013 under Publication No. WO 2013/010532. This application also claims the benefit of priority of co-pending International Application No. PCT/DE2012/000735, filed Jul. 19, 2012 and German Application No. 10 2011 108 148.1, filed Jul. 20, 2011. The entire disclosures of the above-referenced applications are hereby incorporated herein by reference.

BACKGROUND OF THE INVENTION

The invention relates to a modularly structured gripping mechanism for robots, machines, and handling devices, which comprises at least one finger module that comprises a slide unit, the slide unit carrying, either directly or by means of other mechanisms, a gripping finger that works counter to a different stationary or movable gripping finger.

WO 2006/034238 A2 depicts a gripping mechanism from the same genre having two gripping fingers that are each guided by a prismatic joint on three rods. The hollow center of the slide is embodied as a pneumatic cylinder, the compressed air traveling inside the piston rod via three axial bores into the cylinder chamber and the two gripping fingers being synchronized by means of racks and pinion. When the gripping fingers are extended outward, this gripping mechanism is very torsionally flexible and is not able to hold heavy loads horizontally if the gripping fingers are long. In addition, it is not possible to build a gripping mechanism with more than two fingers using this principle.

In contrast, the underlying object of the invention is to create a modularly structured gripping system for especially heavy loads such that the greatest loadability is attained with respect to flection and torsion and the highest flexibility is attained in terms of number of fingers, finger arrangement, selection of the drive, and geometric arrangement of the fingers, with a minimum of material expense and unladen weight.

This object is attained in accordance with the invention with the features listed in claim 1.

The subordinate claims depict advantageous refinements of the invention.

SUMMARY OF THE INVENTION

In its simplest embodiment, an inventive gripping mechanism has one movable gripping finger that is detachably fixed to the slide of a finger module and is adjustable in its position and works against an immobile gripping finger that is fixed to the flange.

On one end face the finger modules have tabs that project upward and downward and that are for fixing to a flange case. The lower tabs of the finger modules, which are in a desired number and geometrical arrangement, are inserted vertically into circumferential grooves of a flange plate as side walls of a flange case. A front plate with analogous grooves is placed onto the top tabs of the end faces as a cover and is pulled against the flange plate using tension rods. Thus the result is a gripping mechanism with a very stable flange case to which the finger modules are radially fixed.

Each finger module has a slide unit. Each slide unit has a slide and a housing comprising a closed frame of at least four sides, and an optional fifth side for the bottom. The four sides engage one another in a positive fit. Either the entire bottom or a section thereof projects into the housing frame on all four sides and imparts to the frame, as a case that is closed on five sides and is interconnected in a positive fit, the maximum resistance to deformation and twisting. When needed, the sixth side of the slide unit may also be closed by a slotted bottom such that the gripping finger projects only from a longitudinal hole.

Between two opposing inner and outer end faces of the housing frame run a plurality of tubular rods that are arranged parallel to one another, preferably on a cylinder, that are pre-stressed with tension, and that clamp with pressure the other two or three sides that are parallel to the rods. All or some of the rods pre-stressed with tension act as guide rods on which the slide of the slide unit slides. The pre-stressing of the rods leads to bowing of the two end faces. A tube is clamped in the middle of the guide rods and parallel thereto between the two end faces and limits the bowing and flexural stress of the end faces and makes the housing of the slide unit continuously hollow.

The slide is preferably created from an aluminum profile having an outer surface profiled along its direction of movement and a plurality of continuously hollow bores. The profiled outer surface receives gripping fingers and other carriers or mechanisms that guide a gripping finger. The slide has a large central bore and a plurality of smaller bores parallel to and preferably concentric with the central bore, and these may be closed all the way around or may be not entirely closed. It slides on a plurality of preferably cylindrical guide rods that are arranged very close to one another and are pre-stressed and that go through its bores. The central bore reduces weight and receives a pneumatic, hydraulic, or electromotive drive or conducts a tube for pre-stressing the guide rods and for limiting the flexural stress of the end faces of the frame. The smaller bores bear the slide on the guide rods, on both sides, receive or conduct drive and synchronization elements such as e.g. strip, cable, chain, belt, pinion, and house or fix springs, dampers, gas compression springs, stop pins, clamping and stopping members, magnetic, incremental, or optical position measuring or position recognition systems, and conduct pressurizing medium, air or oil, to the pneumatic or hydraulic drive.

With a pneumatic or hydraulic drive, the central bore is designed as a cylinder of a cylinder-piston unit in which the piston is securely connected, on one or both sides, by the piston rod to one or both end faces of the housing frame and the cylinder moves translationally, secured against rotation, as a slide on the guide rods. The piston rod is preferably designed continuously hollow and as a piston tube in order, on the one hand, to save material and weight, and on the other hand to keep the center of the gripping device free for other tasks, such as e.g. suctioning, blowing, gripping, pressing, ejecting, lasering, or measuring. The piston in this case is designed as a piston ring sealed against the piston tube by an O ring and axially secured on both sides by retaining rings. The piston tube may also comprise two parts that clamp the piston ring in a positive fit in its center using a shoulder. The piston tube is guided on both sides between the end faces of the housing frame using corresponding shoulders, clamped, and pre-stressed with pressure by the guide rods. Thus the guide rods themselves are pre-stressed with tension and provide great resistance to bowing against the force and torque of the slide. The selection of different piston tube diameters permits different piston surfaces to be produced with different grip force at the same pressure and cylinder diameter.

The slide is borne on the guide rods by attaching linear slide or roller bearings such as e.g. ball splines, at the beginning, in the center, and at the end of the bores of the slide. This prevents the guide rods from bending inside the slide due to the load of the object being gripped. The guide rods of the slide are on both sides inserted into, centered, and guided in the end faces of the housing frame. They are guided into the inner flange-side end face and securely screwed in. The guide rods are inserted with axial clearance into the outer end face facing outward, guided laterally, and tightened against the end face by means of screws and thus pre-stressed. Thus the guide rods cannot simply sag even between the end faces and the slide under the load of the gripped object like a beam and cannot rotate like a shaft.

A finger module of a gripping mechanism, which finger module is designed in this way, is redundant in its static design features and, due to the pre-stressed guide rods and side walls that grip one another in a positive fit and are likewise pre-stressed, has the maximum flexural strength in each of the three spatial planes and the maximum torsional stiffness about each of the three spatial axes with a minimum of material and unladen weight, which benefits the ability of the robot to carry things.

At least two guide rods run in closed bores that are sealed to the outside on both sides with rod seals and are provided with a dirt wiper. These rods are continuously axially hollow and have at least one transverse bore approximately in the center. The axial bore and the transverse bore of the rods lead the pressurizing medium from the inner, i.e. flange-side, end face of the slide unit via the sealed smaller bores of the slide through a connection bore to the large cylinder space. The fixed piston separates the cylinder space into two work chambers. These work chambers are each sealed from the outside using an annular cylinder cover with a static seal against the slide and with a dynamic seal and a dirt wiper against the piston rod and with a retaining ring against the slide. The piston does not move so that the cylinder lid, and with it the slide, is caused to move by the pressurizing medium.

One transverse bore goes outward to the profiled surface of the slide from each of the bores in the slide that are conducted by the pressurizing medium or from the two work chambers of the cylinder-piston unit, for instance directly behind the cylinder lids, and acts as a hose-less energy source for producing another rotational or translational movement of the finger that is fixed to the slide. This additional movement may be coupled automatically to the movement of the slide or may be controlled using a separate valve.

The inner, i.e. flange-side, end face of the slide unit has tabs that project above and below the housing frame and that engage in a positive fit in the gripper flange and in the front plate disposed over the flange. When a plurality of slide units are arranged about the flange to create a multi-finger gripping mechanism, the inner end faces of the slide units together with the flange and front plates form a closed and very stable flange case. The front plate is tightened against the flange plate using tension rods. The two plates clamp the end faces of the finger modules between them.

In the center between the front plate and the flange plate, a tube additionally stabilizes the flange case in that the shoulders of the tube engage both sides of the front plate and flange plate and limit the bowing of the front plate, which as a rule is thinner. Thus the center of the flange case also remains free for other tasks and the flange case has high flexural strength and torsional stiffness like the housing of the finger modules. Some of the tension rods between the front plate and flange plate also conduct and distribute the pressurizing medium from the gripper flange to the individual slide units or finger modules. Some also guide and reverse the drive and synchronization element.

Where needed, the movements of the slide are synchronized with one another using a traction means as synchronization element, cable, plastic or steel strip, flat belt, V belt, or toothed belt, but preferably with a chain. The traction means or the synchronization element runs from the inner end face of the slide unit through a bore in the slide and is fixed to the slide using a fastening element. From there the synchronization element runs through a tension and adjusting ring in the outer end face of the slide unit, is reversed 180° using a reverse and guide part, and then runs through a second tension and adjusting ring and through an additional bore in the slide back to the inner end face, from where it is conducted and reversed from inside the flange case to the next slide unit. After passing through all of the slide units, the beginning and the end of the drive and synchronization element are combined and are fixed to one another, preferably in the bore of a slide, and to the slide using a fastening element. The synchronization element passes through each slide twice. The movement direction of the slide and of the gripping finger fixed to it is determined depending on the side on which the slide is fixed to the synchronization element. In this way it is possible in a multi-finger gripping mechanism with synchronized finger movement to open a few fingers while closing other fingers at the same time. One particularly interesting gripping mechanism results when a few gripping fingers with synchronized finger movement grip a labile or coiled part, such as e.g. a steel coil, from outside and other gripping fingers with a discrete drive grip the same part from the inside with a time delay.

There are two variants of the inventive finger module with an electromotive drive in which the stator and the rotor are both disposed in the large cavity of the slide and cause the slide to move using a spindle drive. In the first variant, the stator is connected to the housing of the slide unit, preferably to the inner end face. The rotor turns the spindle shaft, which is preferably borne rotational to both sides in the end faces of the slide unit and moves the nut of the spindle drive, which nut is connected to the slide and thus moves the slide back and forth.

In the second variant of the electromotive drive, a hollow rotor motor is disposed in the large bore of the slide and its stator is connected to the slide and its rotor is hollow and encloses the nut of the spindle drive. In this arrangement, the spindle shaft is securely clamped between the end faces of the slide unit. Because of the rotation of the rotor, the nut moves back and forth, and with it the entire motor with the slide.

Advantageously, a back-geared motor is housed in the flange case, which, with a planetary gear drives a ring with inner and outer teeth as a ring gear, which itself is engaged with the synchronization element for instance at its points of reversal in the flange case and thus drives all slides of the slide unit synchronously.

In the slide unit with a spindle drive without a motor the spindle shaft is preferably guided out through the inner end face of the slide unit and connected outside of the slide unit to a toothed wheel, preferably a bevel wheel. In a multi-finger gripping mechanism driven electromotively, a back-geared motor with a large bevel wheel that drives the bevel wheels of all the finger modules together synchronously is seated in the flange case. The enormous advantage of this gripping mechanism is that the heavy back-geared motor is seated in the flange case as a common drive for all finger modules and is thus seated directly on the flange of the robot, while the finger modules without a drive are hollow throughout and are thus very light and yet very torsionally stiff and resistant to bowing.

With a finger module created in this manner it is possible to produce a modular and versatile gripping system with different drive technology, numbers of fingers, finger geometries, finger arrangements, and finger widths.

For a gripping mechanism with two and more movable gripping fingers, a corresponding number of finger modules are fixed to one another or to a flange case in any desired arrangement.

DESCRIPTION OF THE DRAWINGS

In detail,

FIG. 18 provides a top view and a section of three-finger gripping mechanism having an electromotor that is housed in the flange case and that has a planetary gear as a drive. The ring gear of the planetary gear is connected to a chain wheel that engages and drives the single infinitely closed synchronization and actuation chain, preferably at its reversal points.

FIG. 19 is a pneumatically actuated four-finger gripping mechanism for flat parts, tubes, and shafts with the depiction of the pneumatic tubes from the two supply strips for compressed air to the individual finger modules.

FIG. 25 depicts the finger module of FIG. 23 in combination with another, identical finger module.

Identical parts have the same reference number. Reference numbers with a letter indicate different areas, different embodiments, or multiple arrangements of the same element.

DETAILED DESCRIPTION

Figure 1:
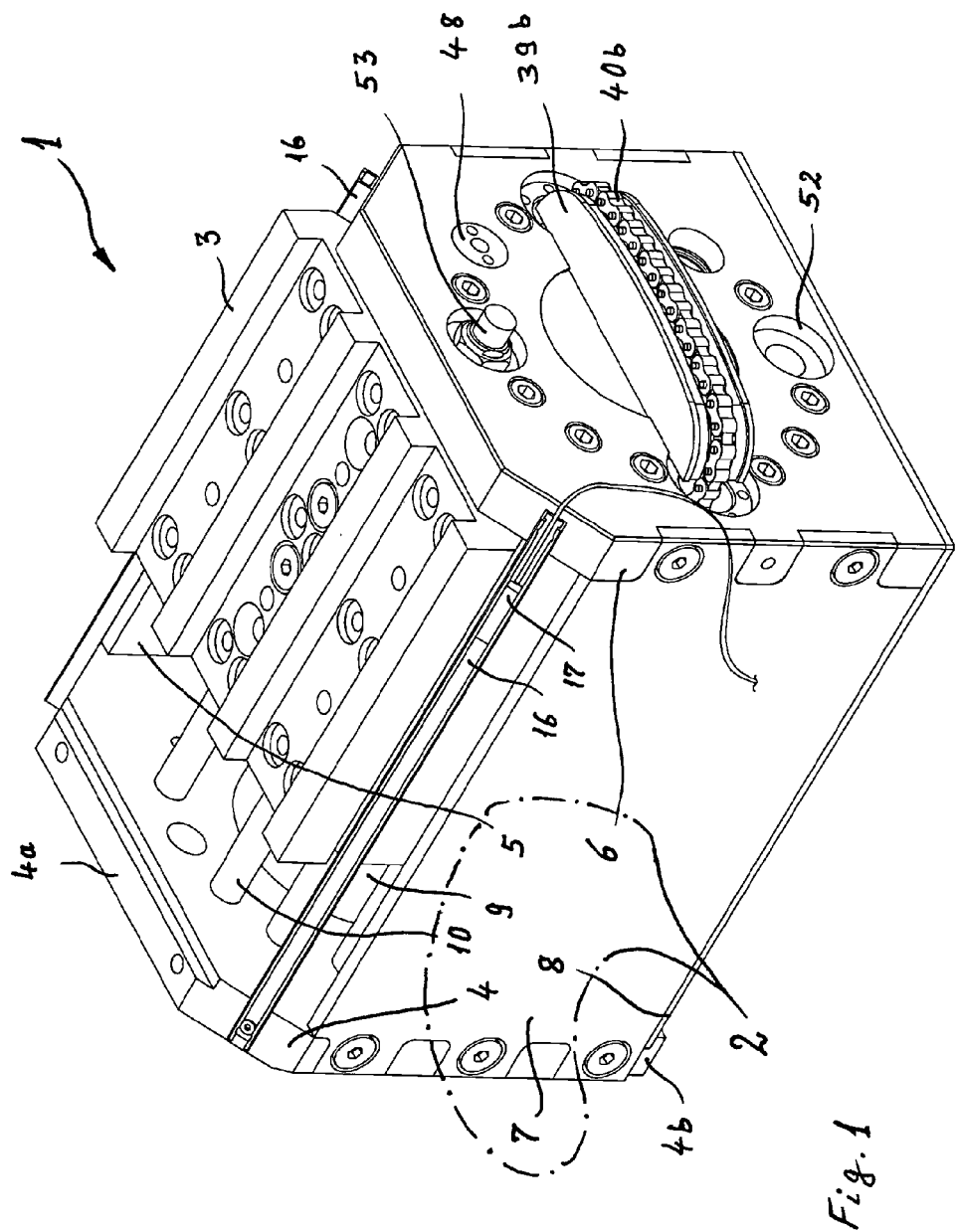
FIG. 1 depicts an inventive finger module having a slide unit comprising a housing, a slide, and a chain as drive or synchronization element. A sensor rail with a sensor is fixed on both the right and left sides on the housing of the finger module.

In accordance with FIG. 1, the finger module (1) comprises a slide unit (2, 3) and a drive or synchronization element (40b) that passes through the slide (3) two times and is connected to the slide on one side. The housing (2) of the slide unit comprises a frame (4, 5, 6, 7, 8) made of four to five interconnected pieces that are screwed together, the end faces (4, 6) of which are pressed together by a plurality of tie rods (10) that run parallel to the side walls and to the bottom such that the rods themselves are pre-stressed with tension and the end faces are pre-stressed with flection. A tube (9) or a rod placed between the two end faces and in the middle of the tie rods (10) limits the bowing of the end faces. The inner end face of the housing frame (4) has tabs (4a, 4b) that project beyond the side walls for fixing to a flange case or to another finger module. The slide (3) receives a gripping finger. A sensor rail (16) is fixed on each side of the housing frame (2) and receives sensors (17). For detecting the position of the slide, there is one groove on each side of the slide below the sensor rail, in which grooves permanent magnets are fixed. The permanent magnets move with the slide below the fixed sensor rails (17). They activate the magnetic sensors (17) as soon as they approach them.

Figure 2:
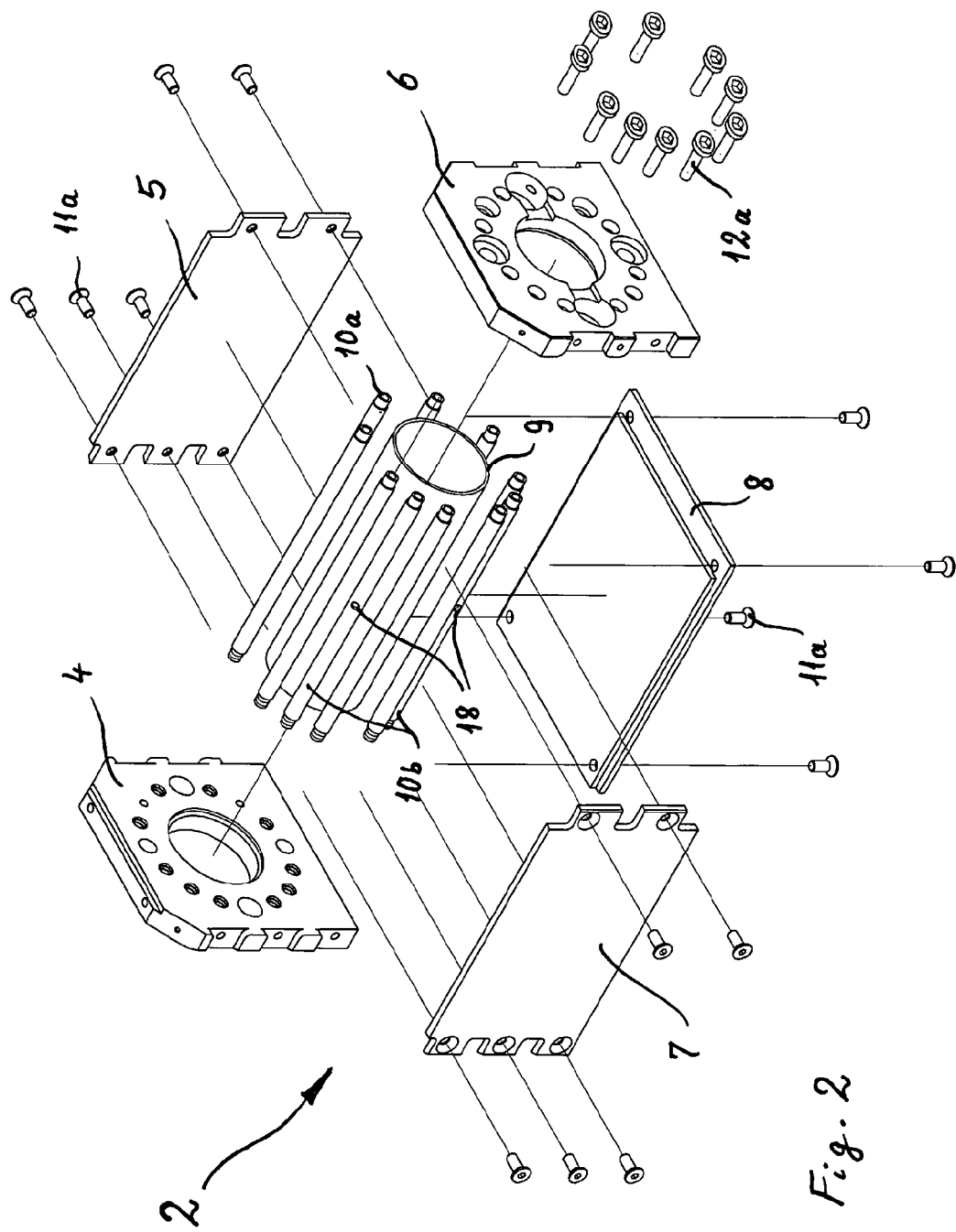
FIG. 2 is an exploded depiction of the housing of the slide unit.

In accordance with FIG. 2, the housing (2) of the slide unit comprises a frame (4, 5, 6, 7), a central tube (9), and a plurality of rods (10a, 10b) placed about the central tube, preferably coaxially like a tube slit in the longitudinal direction. The frame comprises at least four sides (4, 5, 6, 7) that are inter connected with one another in a positive fit and that are screwed to one another using countersunk screws (11a). The frame optionally has a bottom (8) that projects either entirely or with a shoulder only partly into the frame and prevents the rectangular frame from being deformed by the load of the gripped object.

A plurality of rods (10a, 10b) and a central tube (9) are placed between the two end faces (4, 6). The center of each end face has a central bore with an inward shoulder for receiving and for clamping the tube (9) and has a plurality of additional bores for receiving the rods (10a, 10b) and for receiving or passing through other machine elements such as for instance springs, dampers, tensioning and pressurizing medium, drive and synchronization elements, sensors, and optical or magnetic transmitters and receivers.

Each side of the rods (10a, 10b) has one precision-fit shoulder. On the one side they preferably have a male thread and on the other side a female thread. Some of the rods (10a) act as guide rods for receiving and precisely guiding the slide (3). Their male thread, shoulder, and part of their outer surface are inserted into the precision-fit bores with shoulder and female thread of the end face (4) and securely screwed therein. On the other side, the outer surface and shoulder of the guide rods are also inserted axially movable into the precision-fit bores of the outer end face (6) and with their female thread are tightened against the outer end face (6) with a defined torque by the cylinder head screws (12a). Thus the guide rods are guided into the end faces (4, 6) on both sides with no clearance and are held with tensile stress.

The guide rods (10a, 10b) clamp the end faces (4, 6) of the frame against the side walls (5, 7) and, if it is present, also against the bottom (8) of the housing (2). The end faces (4, 6) bow until the tube (9), the length of which is calculated precisely, is securely clamped. In this way the guide rods are pre-stressed with tension and all other parts of the housing (2) are pre-stressed with pressure.

The tube (9) may also be replaced by a complete rod or a threaded rod or a spindle shaft.

Figure 3:
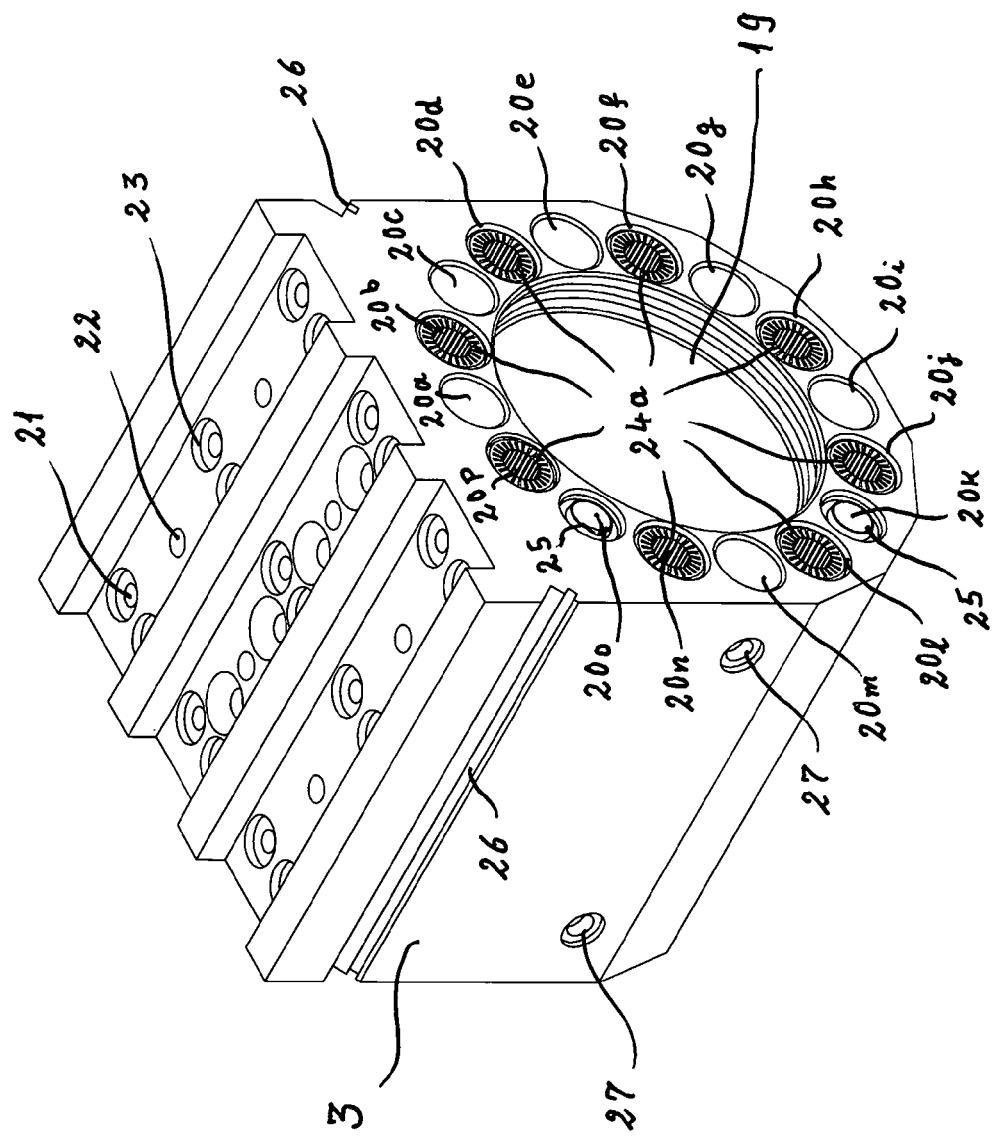
FIG. 3 depicts the slide of the slide unit.

In accordance with FIG. 3, the slide (3) has a large central bore (19) and a plurality of smaller bores (20a through 20p) that run parallel to the central bore (19) and are preferably cylindrical and arranged coaxial thereto. The central bore (19) saves weight and houses drives or every type and other machine elements. Pressed into some of the smaller bores (20b, 20d, 20f, 20h, 20j, 20l, 20n, 20p) at the beginning, at the end, and in the center of the bores are up to three linear slide bearings (24a, 24b) or linear roller bearings or ball linings. These bearings receive and guide, with low friction, the guide rods (10a) on which the slides slide. Thus the guide rods cannot bow due to the load of the gripped object, even inside the bores of the slide. The cylindrical arrangement of the guide rods together with their multiple bearing and guidance in the end faces (4, 6) and in the slide (3), together with their pre-stress, impart to the finger module (1) the maximum flexural rigidity in each spatial plane and the maximum torsional stiffness with respect to each axis of the space with a minimum of material and weight.

On at least one side the slides (3) has a profiled surface longitudinally parallel to the axis of the central bore (19) that with its threaded bores (21), centering bores (22), and centering countersinks (23) receive gripping fingers and other parts that retain or guide the gripping finger.

In finger modules having an integrated pneumatic or hydraulic drive, two of the small bores (20k, 20o) on both sides have a rod seal with wiper (25). The guide rods (10b) pass through these sealed bores and each have an axial bore and in the center a transverse bore (18). The sealed bores (20k, 20o) of the slide (3) each have a bore as a transverse connection to each end face of the central bore (19).

Added to at least two outer sides of the slide (3) in the longitudinal direction of the central bore (19) are grooves (26) that receive permanent magnets for sensors and other magnetically reacting sensors.

At least two of the smaller bores (20e, 20m) are for passing through traction means such as e.g. ribbon cable made of plastic or metal, chain, belt, toothed belt, rod, rack. The traction means is fixed to the slide (3) in one of the two bores (20e, 20m) of the slide using one of the two transverse bores (27) and acts either as drive element or as synchronization element.

Two other bores (20a, 20i) of the slide (3) receive stop pins that, when the slide moves, move against dampers that are mounted in the end faces (4, 6). The stop pins together with the dampers limit the travel path of the slide in both directions and also dampen each end stop.

Two other bores (20c, 20g) of the slide are for fixing ends of gas pressure springs that press the slide (3) selectively against the end face (4) or (6) and secure the object if there is a power failure.

Figure 4:
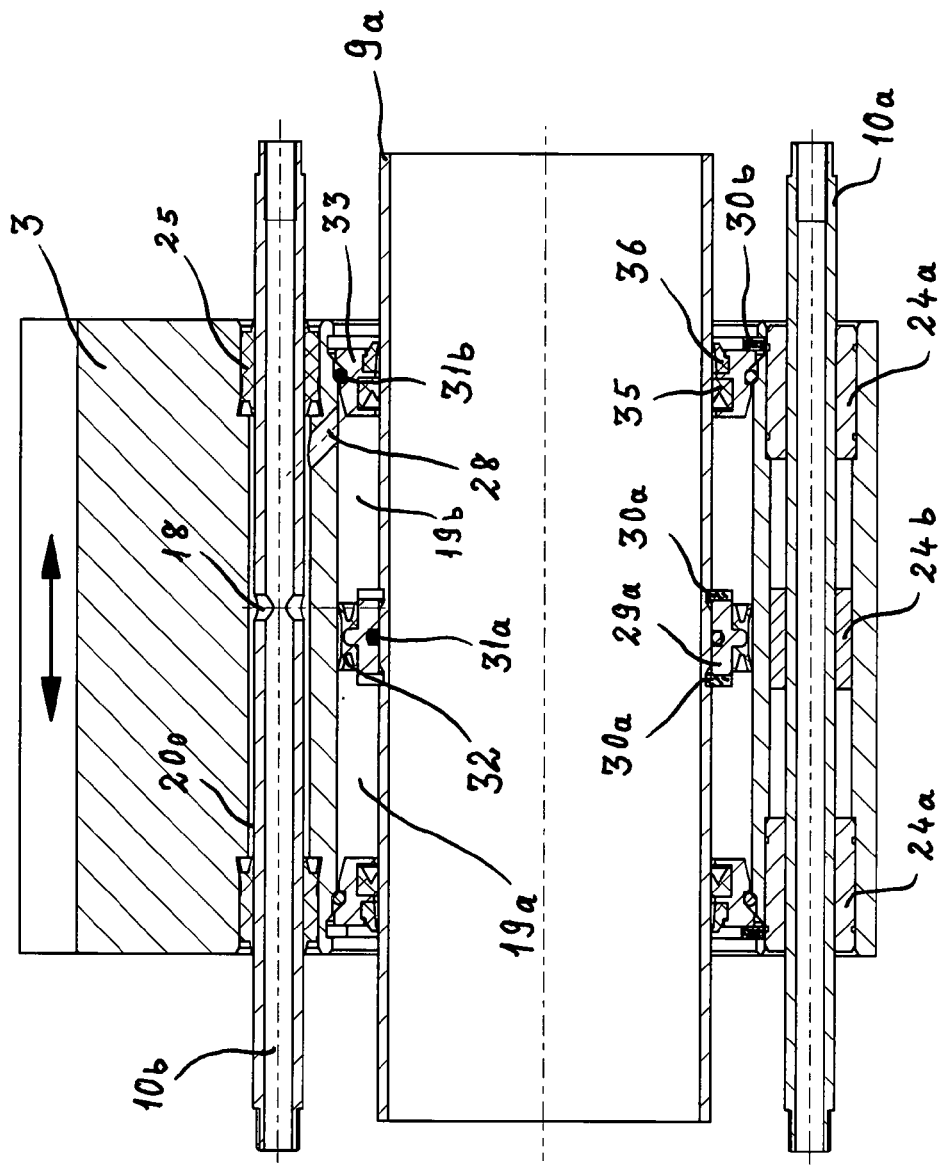
FIG. 4 is a section through the slide unit. The section goes through a rod conducting pressurizing medium, a guide rod, and through the central bore of the slide, which is embodied as a cylinder for a cylinder-piston unit built into the slide as the actuating unit for the finger module. The tension tube acts as the piston tube for the actuating unit.

In accordance with FIG. 4, the central bore (19) of the slide (3) is embodied with the tensioning tube (9a) as a cylinder-piston unit. The piston ring (29a) is axially secured on the tensioning tube (9a) by means of retaining rings (30a) and is sealed against the tensioning tube (9a) with the O ring (31a). The piston seal (32) is seated on the piston ring (29a) and divides the hollow cylindrical space between the tensioning tube (9a) and the central bore (19) of the slide into two work chambers (19a, 19b). These work chambers are each sealed at their end faces by the two cylinder covers (33), each with the O ring (31b), against the wall of the central bore (19) and with the dynamic rod seal (35) against the tensioning tube (9a). On the tensioning tube the cylinder cover (33) has the wiper (36) and is axially secured by the retaining ring (30b) in the central bore (19) of the slide (3).

The pressurizing medium flows from one of the two end faces, preferably from the inner end face (4) of the housing through the hollow guide rod (10b) and the two transverse bores (18, 28) into the work chambers (19b) of the cylinder-piston unit and moves the slide to the right, since the piston tube is clamped and cannot move. Analogously, the pressurizing medium travels through the second through-bored guide rod in the bore (20k) into the work chamber (19a) and moves the slide to the left.

Both sides of the guide rods (10a) are borne in the bores of the slide (20b, 20d, 20f, 20h, 20j, 20l, 20n, 20p) on linear slide or roller bearings (24a) and also in the center by the linear bearing (24b). The rods (10b) conducting pressurizing medium are sealed on both sides in their bores (20k, 20o) by the rod seals (25).

Figure 5:
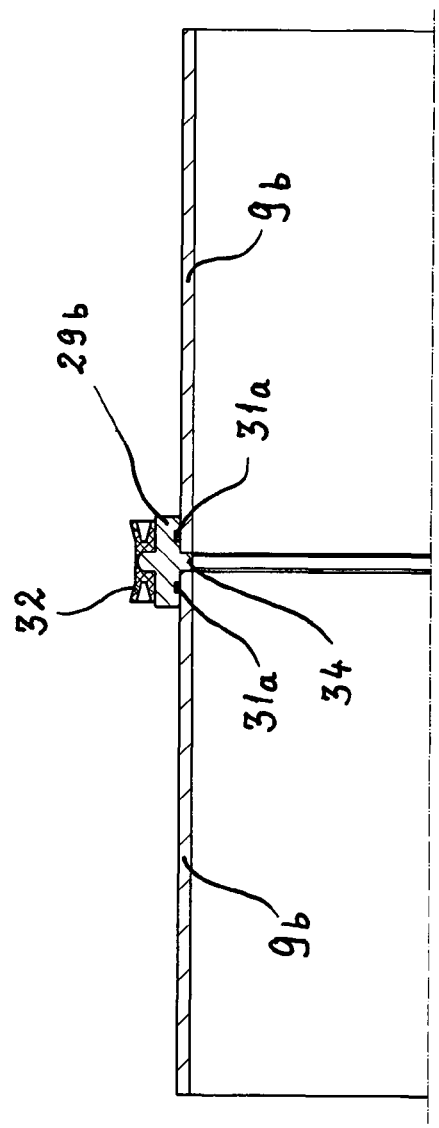
FIG. 5 is a section through the two-part piston tube that with a shoulder clamps the piston ring in the center between its two halves.

In accordance with FIG. 5, the pre-stressed piston tube comprises two equal halves (9b) that in their center clamp the piston ring (29b) on its inner shoulder (34).

Figure 6:
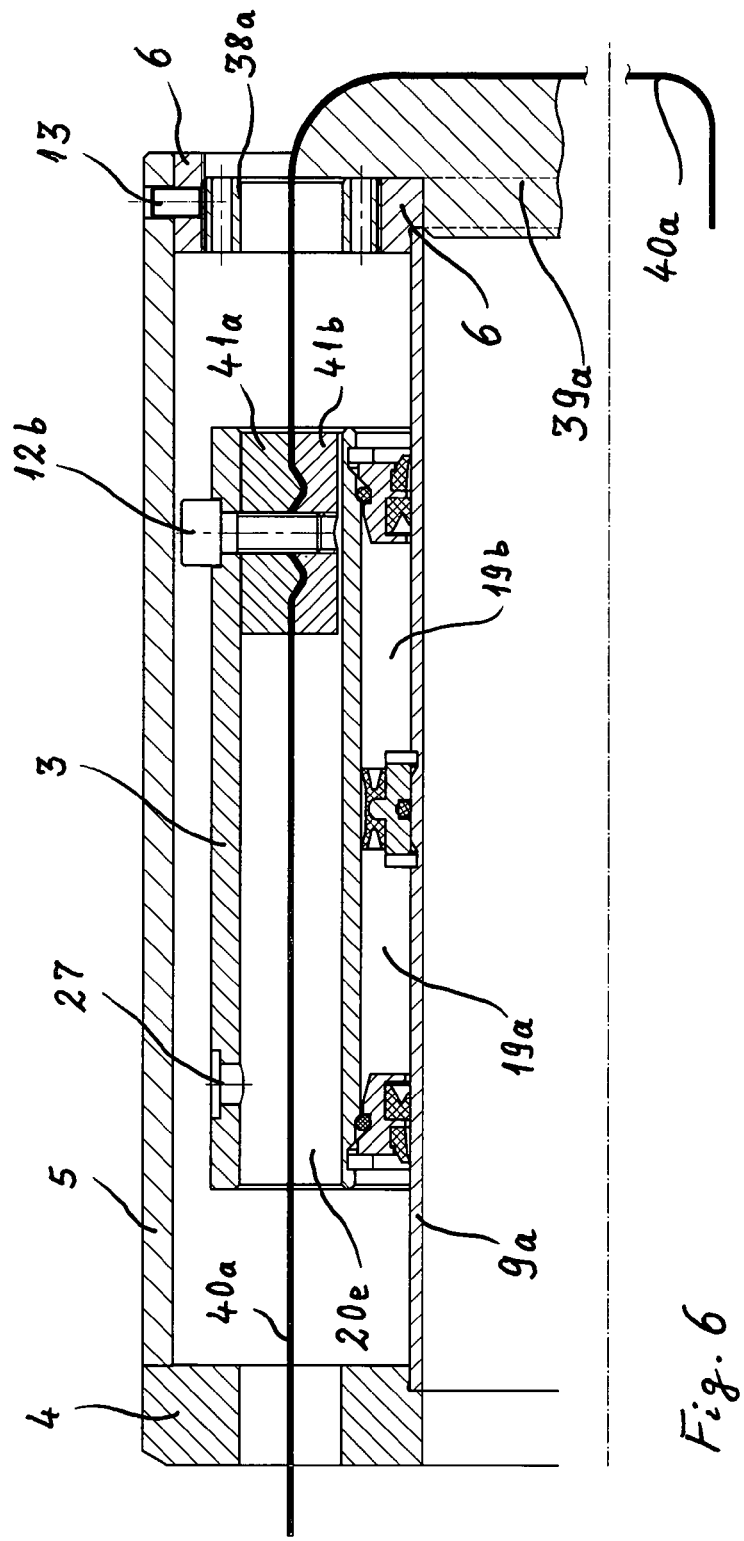
FIG. 6 is a section through a slide unit actuated by a pressurizing medium in which slide unit a ribbon cable, as synchronization or actuating means, runs through the inner end face into a bore of the slide, is fixed to the slide there, and then is reversed 180° at the outer end face and returned.

In accordance with FIG. 6, a ribbon cable (40a) made of steel or plastic as a synchronization element of the slide (3) for all slide units of a gripping mechanism runs through a bore in the inner end face (4) of each slide unit and further through a bore (20e) of the slide (3), where, with the two-part shaft-shaped fastening element (41a, 41b) and the cylinder head screw (12b), it is fixed to the slide (3). From there the ribbon cable (40a) runs through the tension and adjusting ring (38a) and via the reverse and guide part (39a), which are disposed completely in the outer end face (6). The ribbon cable (40a) is guided laterally by the reverse and guide part (39a) in order to be diverted 90° twice and returned through another bore in the slide (20m) without being fixed thereto to the inner end face (4) of the slide unit. If there is no intrinsic drive, the ribbon cable (40a) also acts as drive means for all slides (3) of a gripping mechanism. As a rule the ribbon cable comprises rust-proof spring steel. For simple tasks that are not very precise it is also possible to use conventional commercially available plastic strips that are used in the packaging industry for cardboard packaging for the synchronization element. The reverse and guide part (39a) preferably comprises a plastic with a good glide properties such as PTFE, POM, polyamide, S-green or Delrin.

Figure 7:
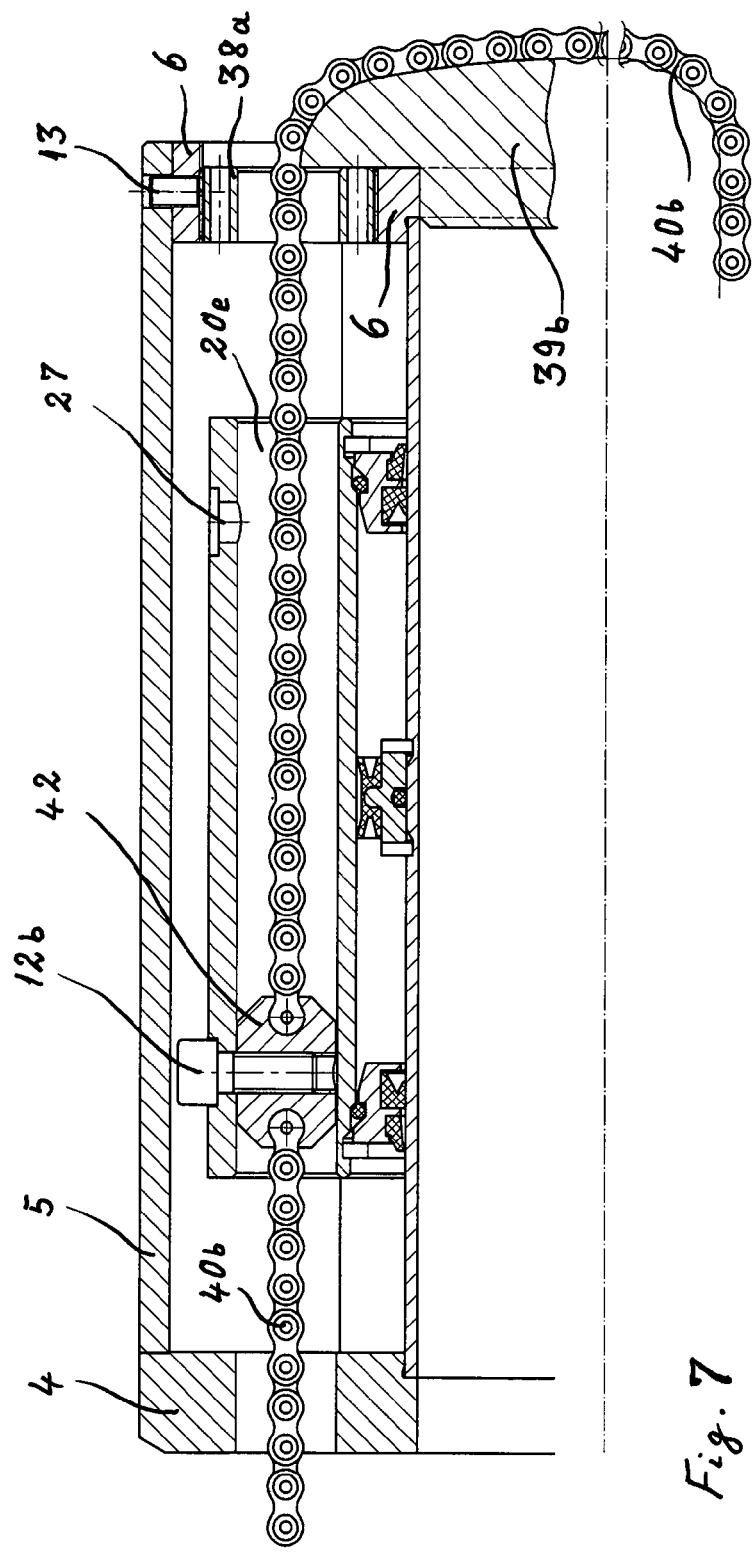
FIG. 7 is a section through a slide unit actuated by pressurizing medium in which a chain, as synchronization or actuation means, runs through the inner end face into a bore of the slide, is fixed there to the slide, and then is reversed 180° at the outer end face and returned.

In accordance with FIG. 7, a chain (40b) acts as synchronization element for all slides (3) in a plurality of slide units of a multi-finger slide mechanism. The chain (40b) passes continuously through all slide units of a gripping mechanism. It is fixed to the wall of one of the bores (20e) or (20m) only once in each slide using a chain lock (42). If there is no intrinsic drive, the chain (40b) also acts as drive means for all slides (3) of the gripping mechanism.

Figure 8:
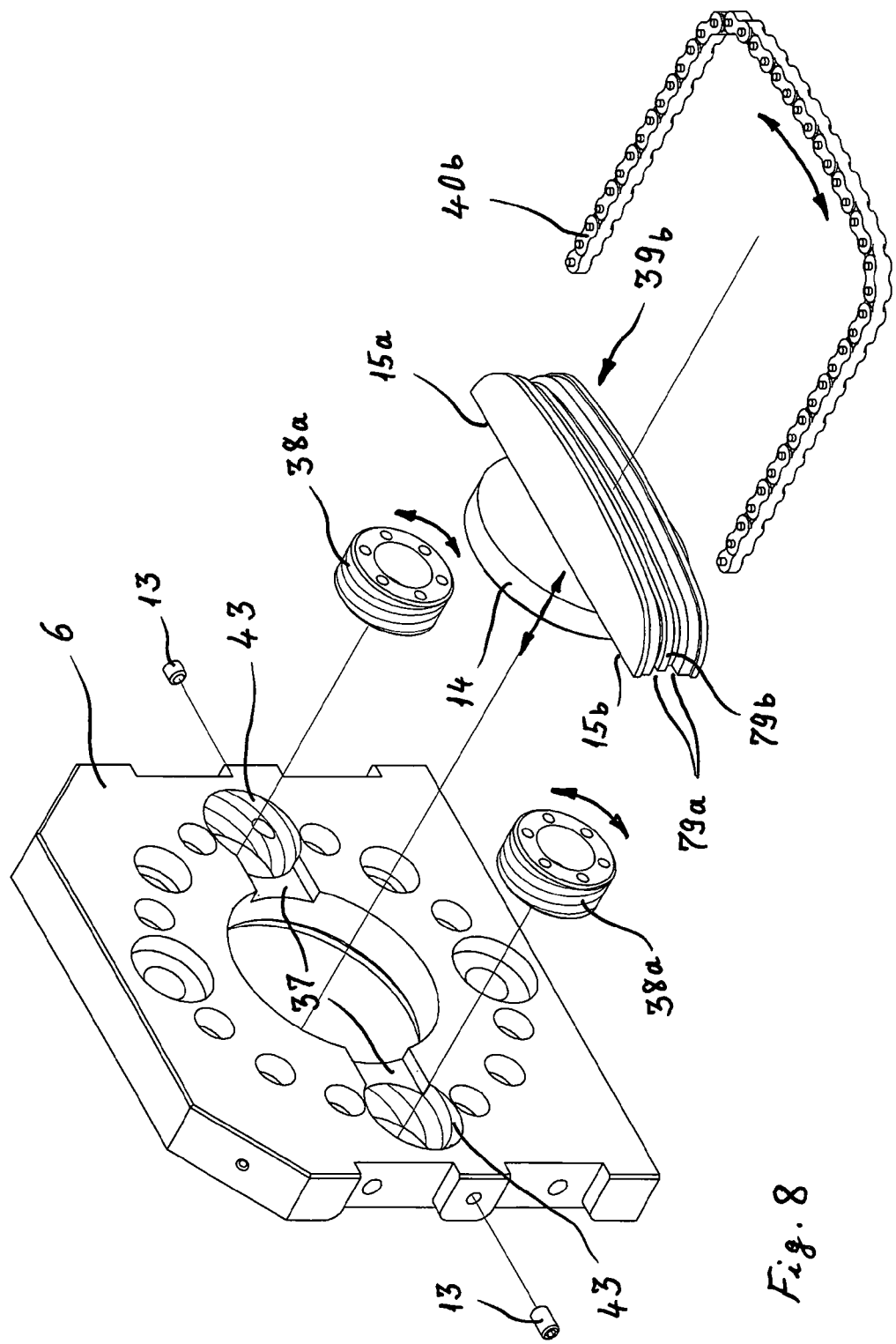
FIG. 8 is an exploded depiction of the outer end face of the housing frame having two tension and adjusting rings, one synchronization and drive chain, and one reverse and guide part.

In accordance with FIG. 8, there is a threaded bore (43) disposed in the outer end face (6) of the housing frame (2) opposing each of the bores (20e, 20m) of the slide, and these threaded bores (43) receive the two tension and adjusting rings (38a) and (38b). The reverse and guide parts (39a, 39b) of the ribbon cable (40a) and the chain (40b) have a cylindrical part (14) that projects axially movable into the central bore of the outer end face (6) and lateral thereto has two tabs (15a, 15b) with three straight sides and a fourth side as guide track. The tabs (15a, 15b) project axially movable into the longitudinal groove or the milled-out area (37) between the threaded bores (43) and the central bore of the end face (6). The groove or the milled-out area (37) acts as an anti-rotation element for the reverse and guide parts (39a) and (39b). The lateral tabs (15a, 15b) of the reverse and guide parts (39a, 39b) project into the threaded bores (43) far enough that the drive and synchronization element (40a, 40b) runs centrically on the axis of the threaded bores (43). For the purpose of reversing and laterally guiding the drive and synchronization chain (40b), the guide track for the reverse and guide part (39b) has two grooves (79a) in the center and a center bar (79b) between the two grooves along the guide track. The lateral parts of the chain members project into the two grooves (79a) and the rolling bodies of the chain members roll on the center bar (79b) between the two grooves (79a).

Due to the rotation of the tension and adjusting rings (38a, 38b), the reverse and guide parts (39a, 39b) are axially displaced and the tension of the drive and synchronization element (40a, 40b) is increased or reduced. Even fine adjustments to the position of the slides of a multi-finger gripping mechanism relative to one another can be made using the tension and adjusting rings. The tension and adjusting rings (38a, 38b) are secured against rotation with the stud bolts (13).

Figure 9:
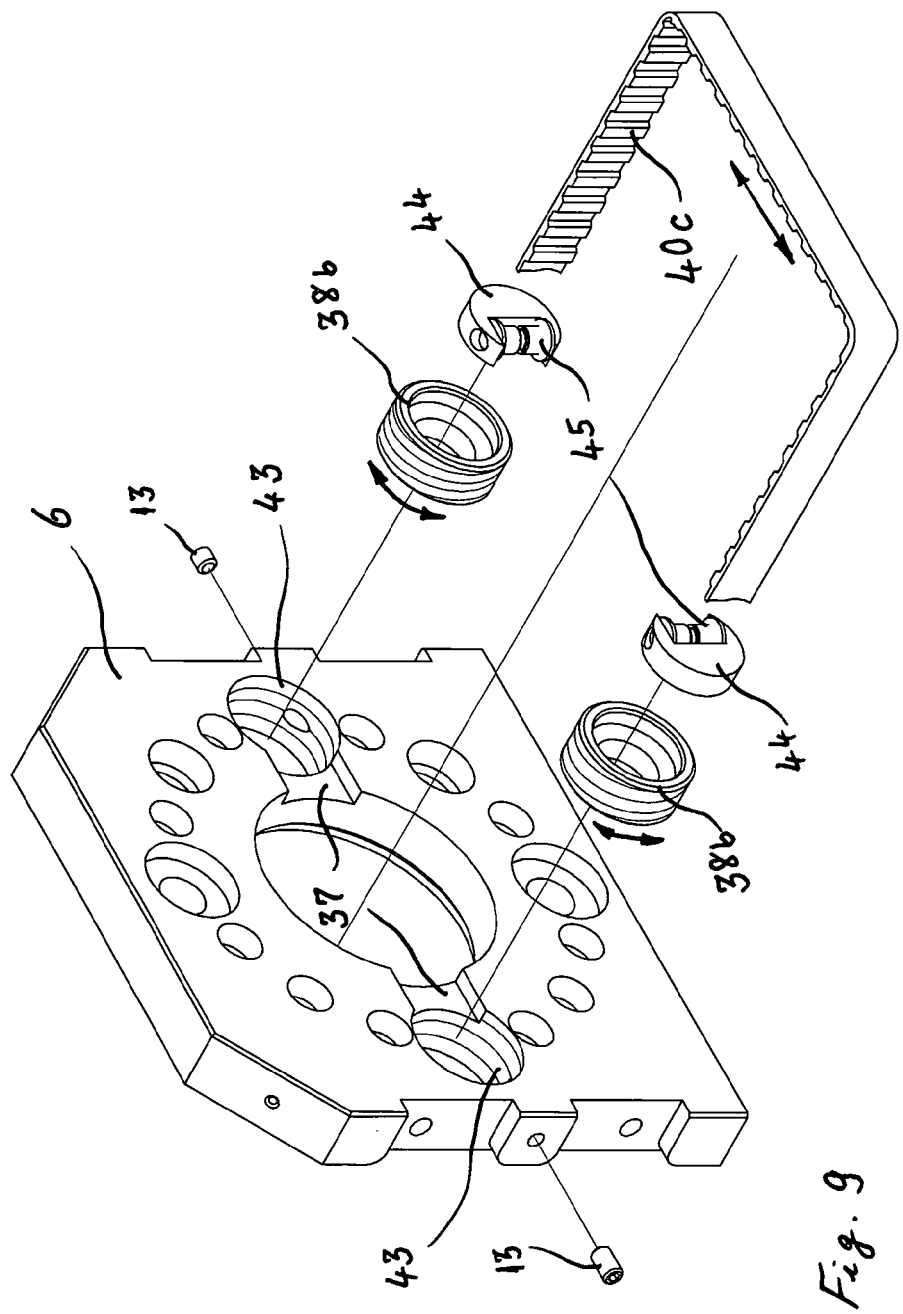
FIG. 9 is an exploded depiction of the outer end face of the housing frame having two hollow tension and adjusting rings, one toothed belt as synchronization and drive member, and two inserts with reverse rollers.

In accordance with FIG. 9, a toothed belt (40c) is the drive and synchronization element of the slide (3). The toothed belt (40c) is guided and reversed via the reverse rollers (45). The reverse rollers (45) are rotatably fixed to the insert (44) and are rotatably inserted into the tension and adjusting ring (38b).

Figure 10:
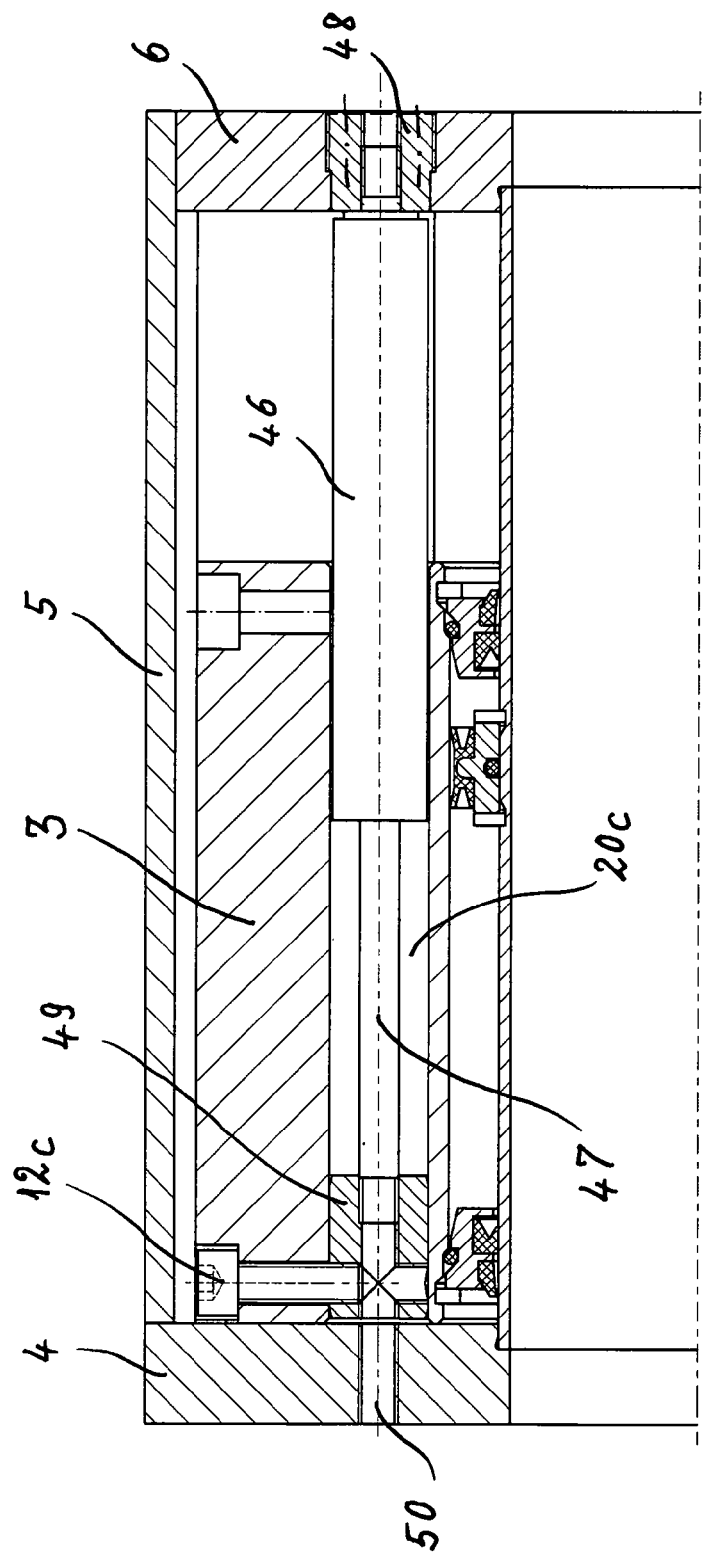
FIG. 10 is a section through a bore in the slide, in which bore the piston rod of a gas compression spring is fixed and with its cylinder body presses the slide to the left against the outer end face of the slide unit.

In accordance with FIG. 10, a gas compression spring, the cylinder body (46) of which is connected to the outer end face (6) of the slide unit using a set screw (48), is disposed in the bore (20c, 20g) of the slide (3). The piston rod (47) of the gas compression spring is screwed with a bolt (49), which itself is fixed in the bore (20c) of the slide using the screw (12c) and presses the slide to the left. Analogously, the piston rod (47) of the gas compression ring is screwed into the threaded bore (50) of the inner end face (4) and the cylinder body (46) is fixed to the bore (20g, 20c) in order to press the slide (3) to the right. The gas compression springs or mechanical springs secure the object and hold the gripped object if there is a power failure.

Figure 11:
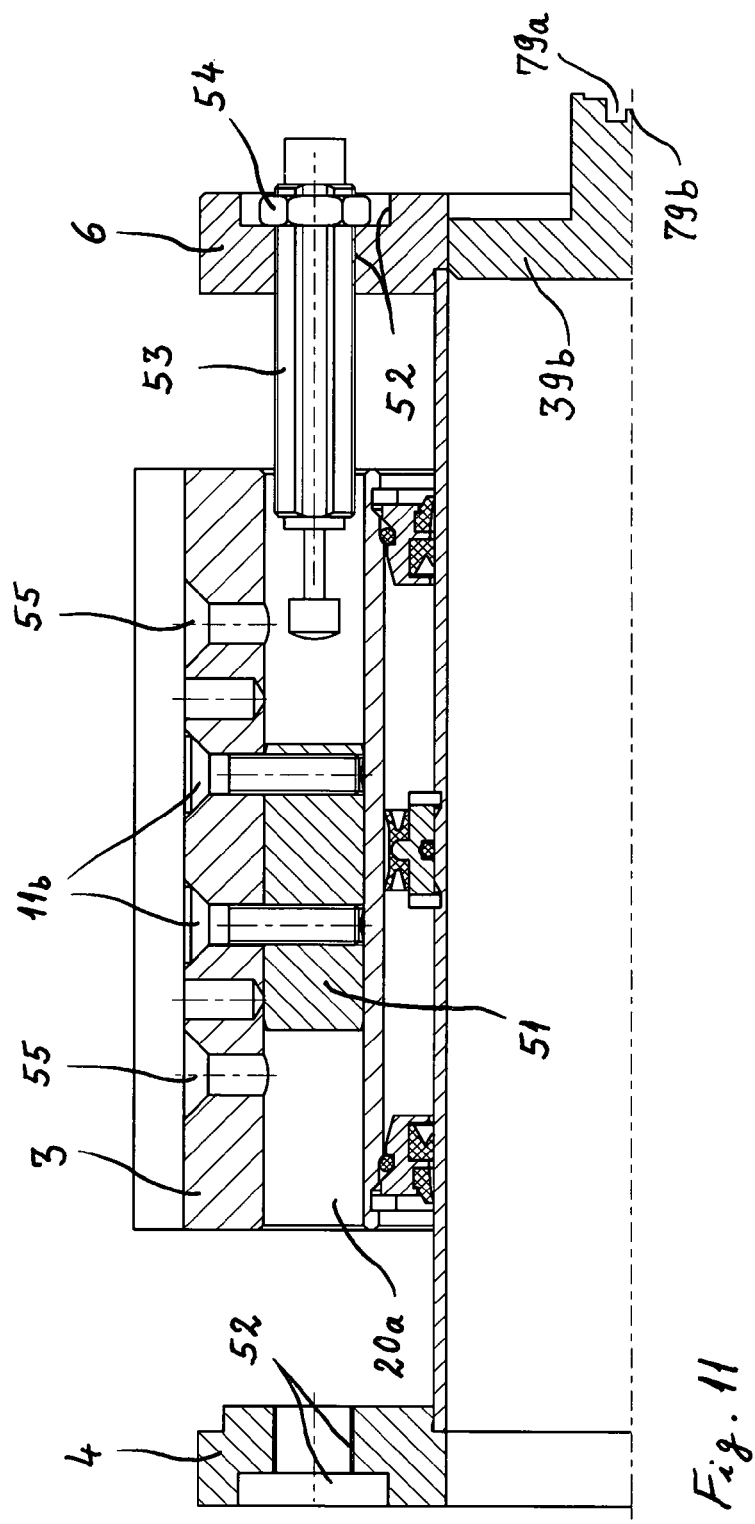
FIG. 11 is a section through a bore in the slide, in which bore a bolt is fixed as a stop for a damper. The damper is fixed to the outer end face of the slide unit.

In accordance with FIG. 11, the stop bolt (51) is fixed in the bore (20a, 20i) of the slide (3) using the countersunk screws (11b). A threaded bore is disposed on the inner and outer end faces (4, 6) of the slide unit opposing each of the bores (20a, 20i), each threaded bore having a large sink (52) for the purpose of attaching and fixing dampers (53) by means of thread and lock nut (54). The stop bolt (51) has two asymmetrical threaded bores that make it possible to affix it in the one or other direction to different locations of the bores (20a, 20i) in order to limit the stroke of the slide differently and variably as needed and to damp the end stop. For fixing the stop bolt (51), the slide (3) has on its top and bottom sides through-bores (55) for the screws (11b) that project into the bores (20a, 20i) of the slide that are disposed thereunder.

Figure 12:
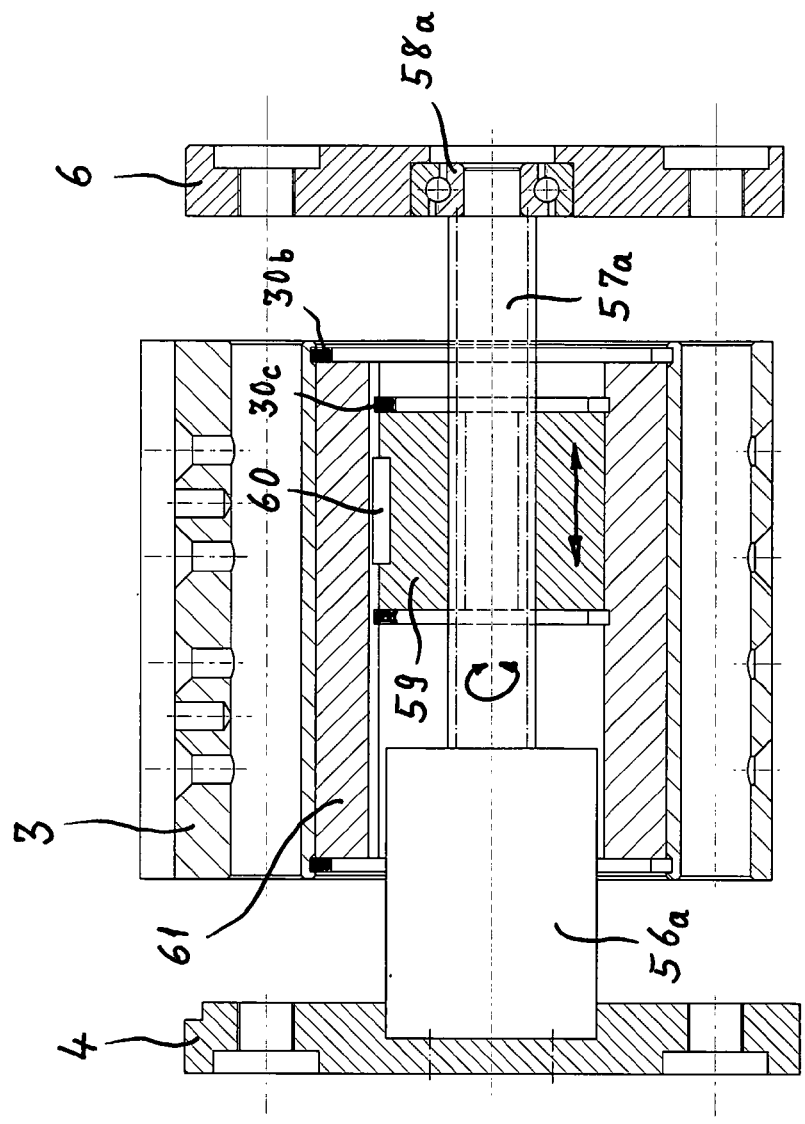
FIG. 12 is a section through a slide unit having an electromotor integrated into the central bore of the slide and a spindle drive. The rotatable spindle shaft of the electromotor is clamped axially between the end faces of the slide unit. The spindle nut of the spindle drive is fixed such that it is secured axially and rotation-fast in the central bore of the slide.

In accordance with FIG. 12, an electromotor (56a) and a spindle shaft (57a) are clamped between the end faces (4, 6) of the slide unit. The spindle shaft (57a) is connected on the one side to the rotor of the electromotor and on the other side is rotatably borne by the roller bearing (58a) in the outer end face (6) of the slide unit and is axially clamped by the guide rods. Using the feather key (60) and the retaining rings (30c) the spindle nut (59) is fitted securely in the tube-like part (61). The tube-like part (61) is fitted securely rotation-fast as an intermediate piece in the slide (3) and is axially secured relative thereto using the retaining ring (30b). The rotation of the spindle shaft (57a) by the electromotor (56a) causes the slide (3) to move back and forth axially.

Figure 13:
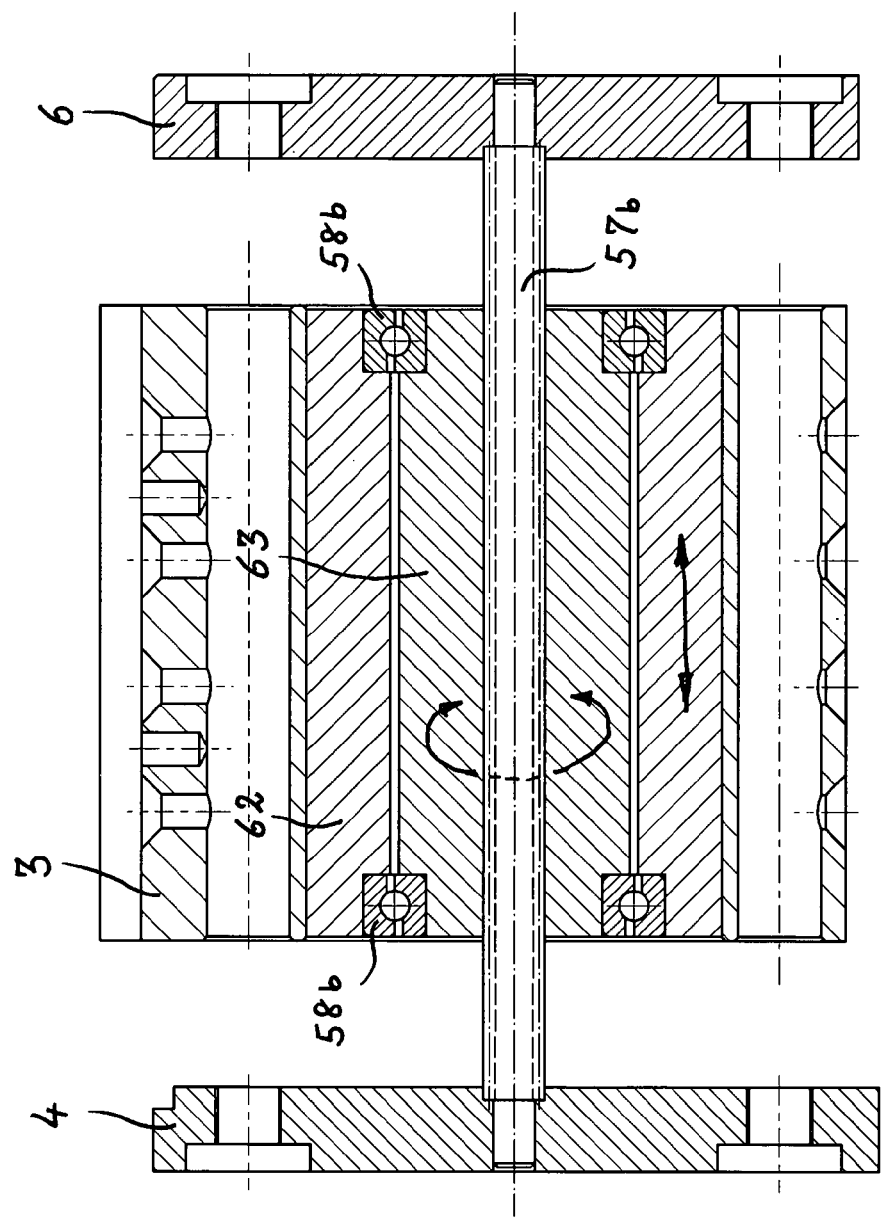
FIG. 13 is a section through a slide unit having an electromotor integrated into the central bore of the slide with a hollow rotor that contains the spindle nut of a spindle drive. The spindle shaft of the spindle drive is securely clamped on both sides between the end faces of the slide unit.

In accordance with FIG. 13, the stator (62) or the housing of an electromotor is securely integrated in the central bore of the slide (3). The rotor (63) of the electromotor is continuously hollow and includes the nut of the spindle drive (57b, 63), the spindle shaft (57b) of which is securely clamped between the two end faces (4, 6) of the slide unit. When the rotor (63) rotates, the slide (3) moves back and forth on its guide rods.

Figure 14:
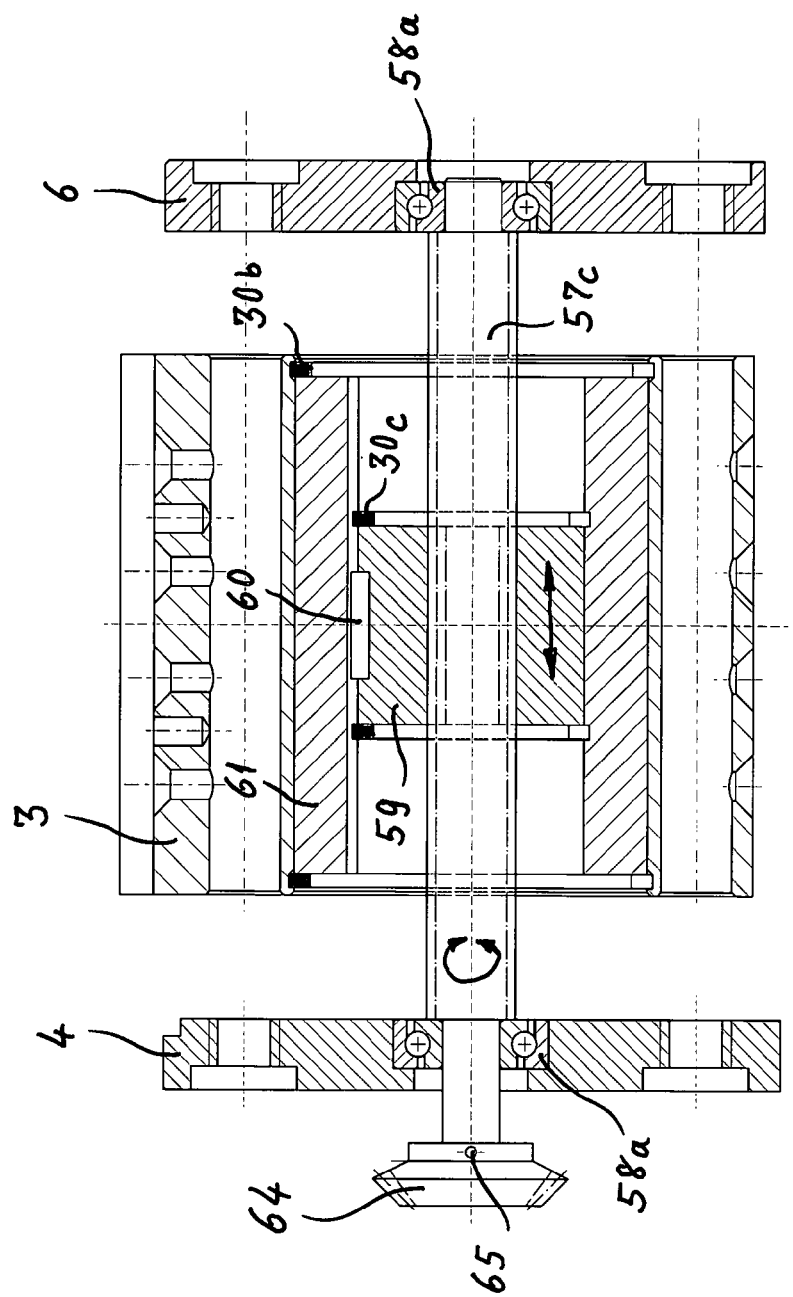
FIG. 14 is a section through a slide unit having a spindle drive integrated into the central bore of the slide unit and comprising a spindle shaft and a spindle nut, in which the spindle nut is fixed to the slide and the spindle shaft is rotatably clamped between the two end faces of the slide unit and is connected to a toothed wheel outside of the inner end face of the slide unit.

In accordance with FIG. 14, the spindle shaft (57c) of a spindle drive is rotatably borne between the two end faces (4, 6) of the slide unit using the roller bearing (58a) and is pre-stressed with pressure by the guide rods. On the inner end face (4) of the slide unit, a toothed wheel, preferably a bevel wheel (64) is fixed to the spindle shaft (57c) using the pin (65). The rotation of the bevel wheel (64) moves the spindle nut (59), and with it the slide (3), back and forth. A slide unit designed in this manner with the spindle drive and bevel wheel is a finger module for a multi-finger gripping mechanism with a common electromotor as drive, which electromotor is seated in the flange case of the gripping mechanism and drives all of the bevel wheels (64) of the spindle drive synchronously with a single bevel wheel.

Figure 15:
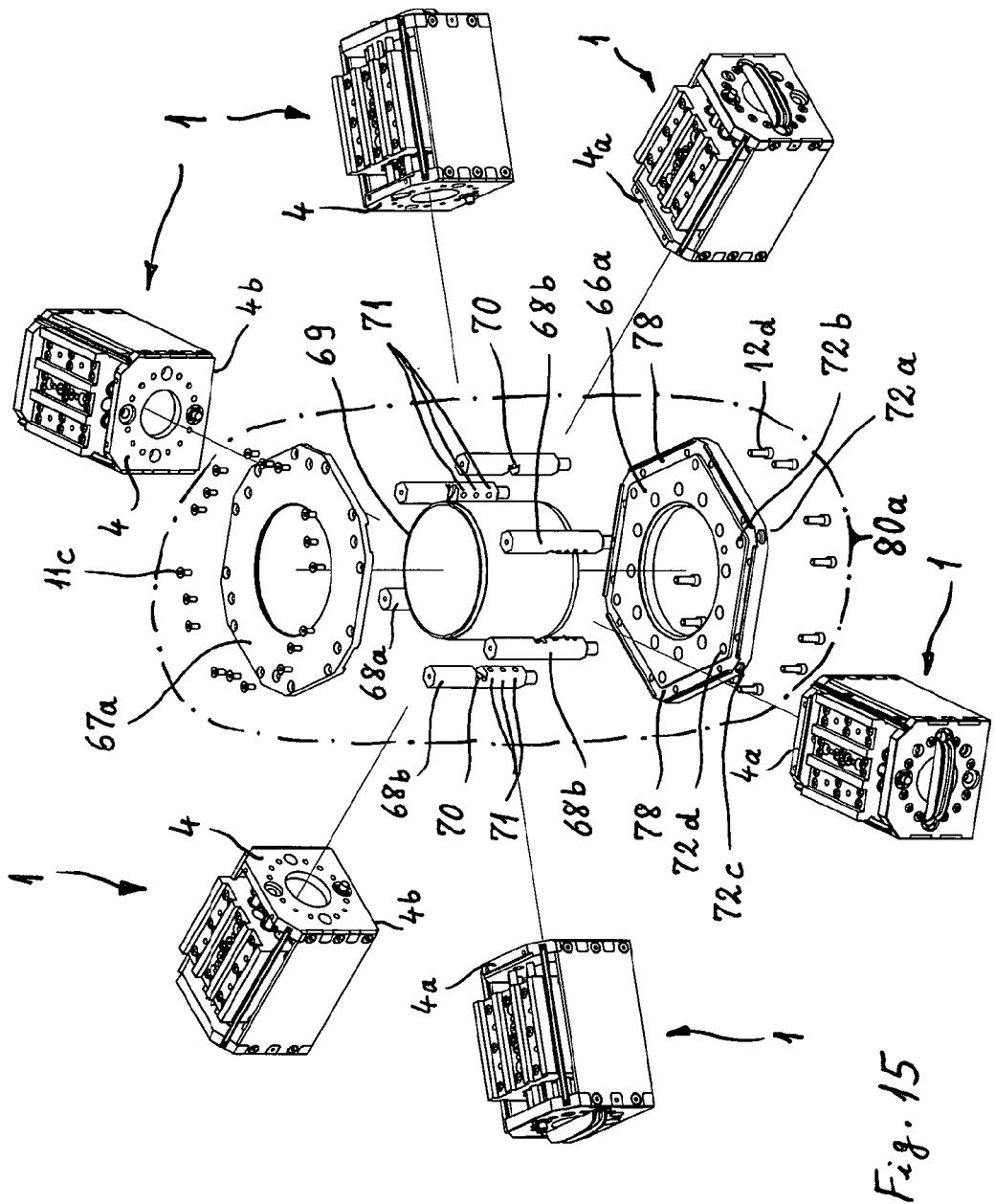
FIG. 15 is an exploded depiction of a six-finger gripping mechanism. The end faces of the individual finger modules project in a positive fit into two plates, the flange plate and the front plate. These two plates are drawn together by tension rods and screwed to one another to create a flange case. A tube in the center of the two plates holds the flange and front plates in a positive fit at a distance from one another.

In accordance with FIG. 15, the upper and the lower projecting tabs (4a, 4b) of the inner end faces (4) of six finger modules (1) are inserted into the corresponding grooves (78) of the flange plate (66a) and the front plate (67a) and tightened and pre-stressed using the tension rods (68a, 68b) and the screws (11c, 12d). The flange and front plates are hollow in the center and each have a shoulder that centers and clamps a tube-shaped part (69) between them. The height of the part (69) is dimensioned relative to the height of the inner end faces (4) such that it limits the flexural stress of the flange and front plates that is caused by the tension rods. The flange plate (66a) together with the inner end faces (4) of the finger modules (1), the front plate (67a), the part (69), and the tension rods (68a, 68b) form a closed and very stable flange case (80a).

Six tension rods (68a, 68b) each have one guide and reverse groove (70) for guiding and reversing the drive and synchronization element (40a, 40b, 40c) from one finger module to the next finger module. A few tension rods have, in addition to the guide and reverse groove (70), an axial bore and a plurality of radial bores with a threaded connector (71) and act as supply strips (68b) and distributors of the pressurizing medium from the flange plate to the individual finger modules. The flange plate (66a) has a plurality of bores for fixing the gripping mechanism to a robot and on the end face side to the circumference of at least two threaded connectors (72a) and (72c) that guide the pressurizing medium for moving the finger modules via the connectors (72b) and (72d) into the supply strips (68b). The male thread of each supply strip (68b) is screwed into the thread of the connectors (72b, 72d) of the flange plate and sealed. They conduct the pressurizing medium from the threaded connectors (72a, 72c) of the flange plate to the threaded connectors (71) inside the flange case (80a).

Figure 16:
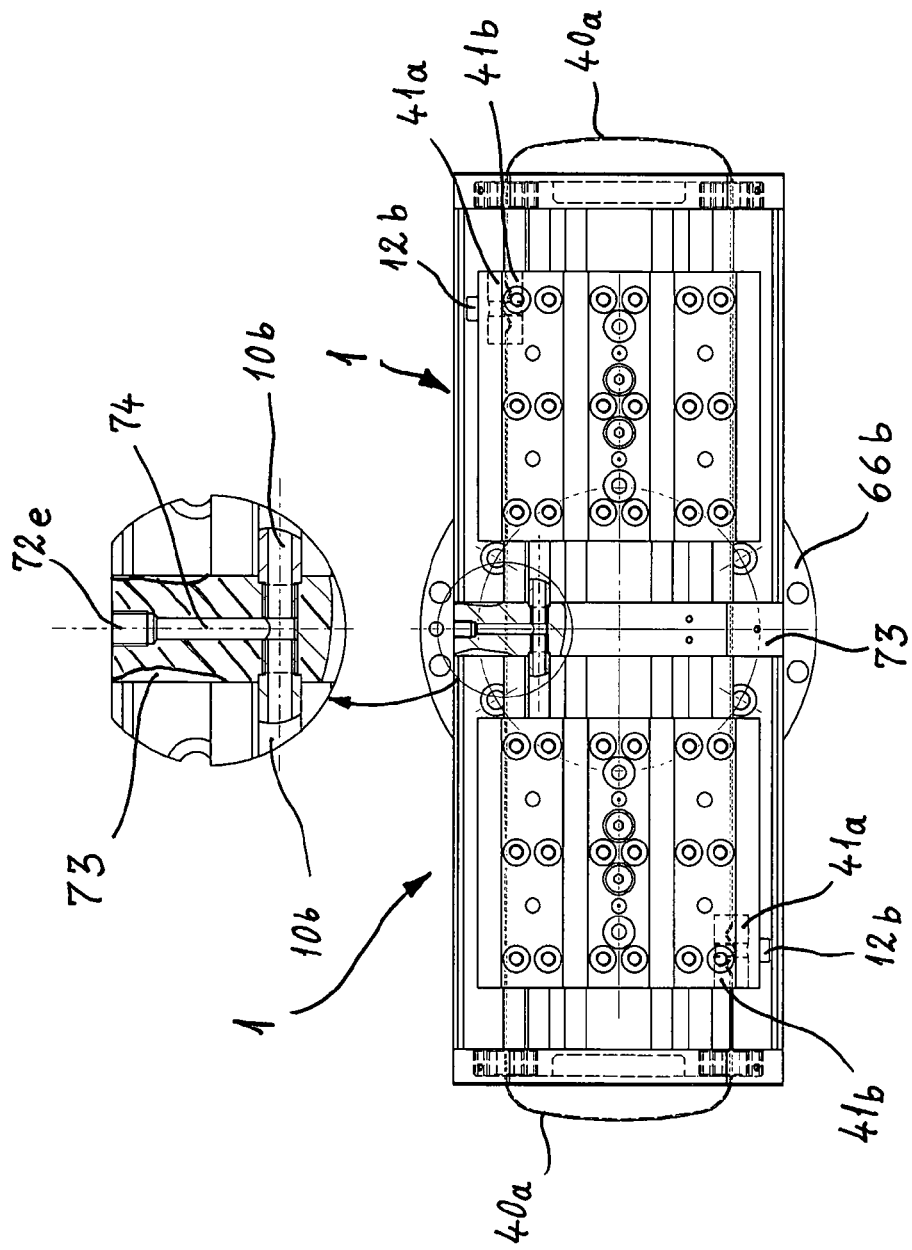
FIG. 16 is a top view of a gripping mechanism with two finger modules, in which mechanism the inner end faces of the slide units are combined to form a common plate. A partial view shows how the pressurizing medium travels via a connector and a bore from outside to the two finger modules.

In accordance with FIG. 16, the end faces of two finger modules are put together to form a single plate as a center bar (73) and fixed to the flange (66b). The finger modules each have their own pneumatic or hydraulic drive. The bores of the two guide rods (10b) conducting pressurizing medium open into the same bore (74) in the center bar and from there either directly to the pressurizing medium connector (72e) or to a connector on the flange. The slide is synchronized using the ribbon cable (40a) by means of fixing elements (41a, 41b) and the screws (12b).

Figure 17:
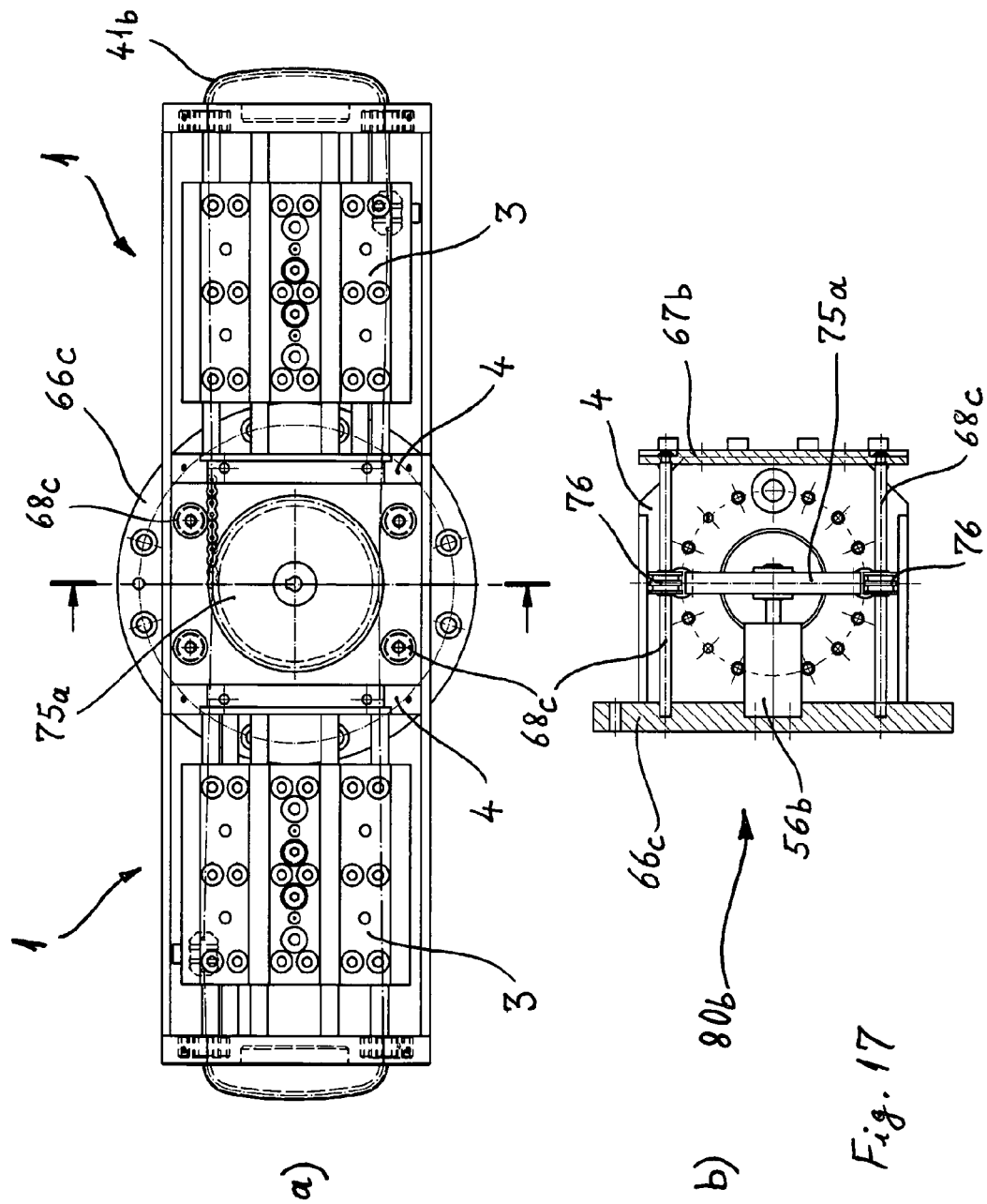
FIG. 17 provides a top view and a side elevation of a gripping mechanism with two finger modules. The inner end faces are inserted in a positive fit into the flange plate and into the front plate and are combined using tension rods to create a closed flange case. An electromotor is seated in the flange case and using a chain wheel drives the drive and synchronization chain for the two finger modules.

In accordance with FIG. 17, the inner end faces (4) of two finger modules (1) with the flange plate (66c) and the front plate (67b) are inserted into one another in a positive fit to form a flange case (80b) and are securely screwed together using the tie rod (68c). The electromotor (56b) is securely seated in the flange case (80) on the flange plate (66c) and its chain wheel (75a) drives the drive and synchronization chain (41b) of the two slides (3). Pressure rollers (76) are rotatably borne on two of the tension rods (68c). The press the chain (41b) into the chain wheel (75a) so that the chain is always engaged with the chain wheel. The drive and synchronization chain (41b) may comprise a continuous infinite chain that is driven by a single chain wheel (75a). It may also comprise two separate parts, one closed chain per finger module. In this case two chain wheels, each a separate chain wheel with a closed chain for each finger module, are seated on the motor shaft.

In accordance with FIG. 18, the inner end faces (4) of three finger modules (1) are put together to create a closed triangle and are inserted into the flange plate (66d) and the front plate (67c) in a positive fit and screwed together using the tension rods (68c) to create a very stable flange case (80c) pre-stressed with tension. The slides (3) of the finger modules (1) are driven synchronously with a closed chain (40b). The chain (40b) is reversed and laterally guided in the flange case (80c) via the reverse and pressure rollers (76) from one finger module to the next. The reverse and pressure rollers (76) are borne rotationally movable on the tension rods (68c), but not axially displaceable. An electromotor (56c) having a planetary gear, comprising the sun wheel (81), the planetary wheels (82) and the ring gear (83), is disposed in the flange case (80c). The ring gear (83) has on its outside the chain wheel (75b), which is engaged with the drive and synchronization chain (40b), preferably at the points of reversal.

In accordance with FIG. 19, the flange case (80d) is formed from the inner end faces of four pneumatically actuated finger modules (1) that are clamped between the flange plate (66e) and the front plate (67d) against the tube-shaped part (69) using the tension rods (68a, 68b, 68c). Four tension rods (68a, 68b) reverse the drive and synchronization element (40b), of which tension rods two (68b) also act as supply strips for supplying the finger modules with pressurizing medium. The tubes (84) connect the connectors of the supply strips (68b) to the rods (10b) conducting the pressurizing medium into the inner end faces of the finger modules (1).

Figure 20:
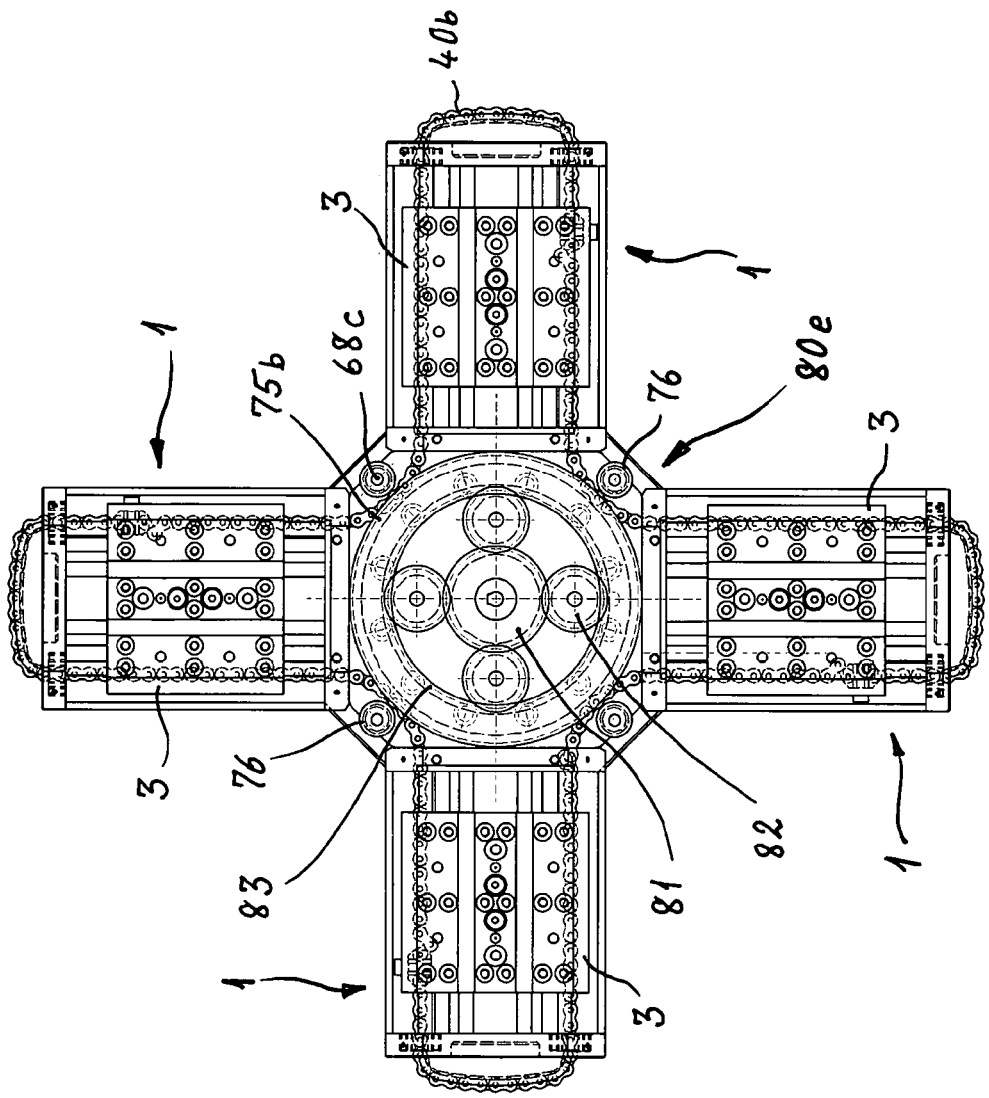
FIG. 20 depicts an electromotively driven centric four-finger gripping mechanism. The electromotor housed in the flange case uses a planetary gear to drive a ring gear. The ring gear is connected to a chain wheel that engages the drive and synchronization chain of the finger modules at at least four locations and drives them.

In accordance with FIG. 20, a flange case (80e) for a centric four-finger gripping mechanism is formed from the inner end faces of four finger modules (1) without an intrinsic drive unit. Disposed in the flange case (80e) is an electric motor with a planetary gear, comprising the sun wheel (81), the planetary wheels (82), and the ring gear (83). The ring gear (83) is connected to a chain wheel (75b) that engages in the drive and synchronization chain (40b) at the four reverse and pressure rollers (76) and drives the slides (3) synchronously.

Figure 21:
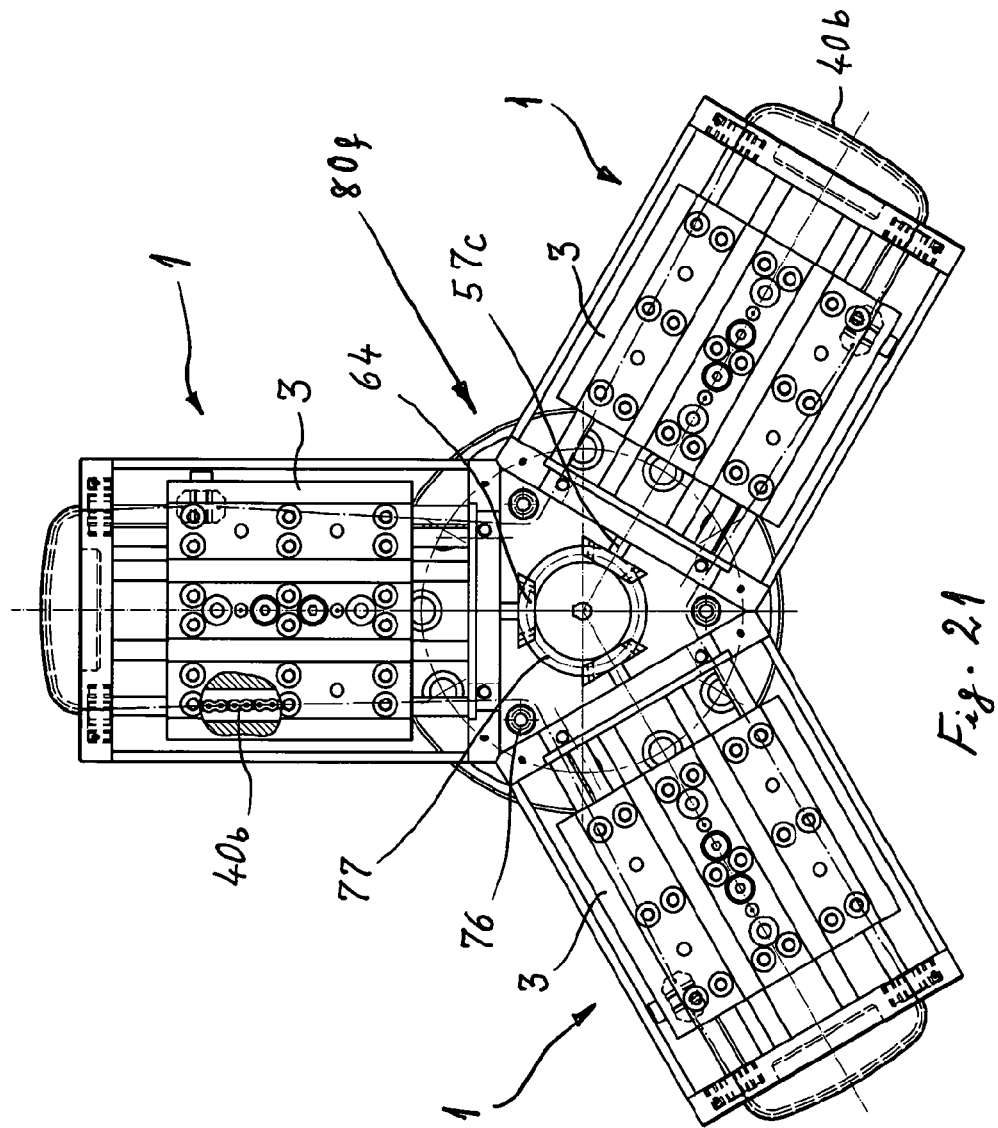
FIG. 21 depicts a centric three-finger gripping mechanism having an electromotor and a bevel gearing as the actuating unit for all three finger modules. The individual finger modules each have a spindle drive as actuating unit with a bevel wheel on the flange-side end of the spindle shaft.

In accordance with FIG. 21, a centric three-finger gripping mechanism is formed by combining three finger modules (1), each having a spindle drive as actuating unit of the slide (3). Disposed in the flange case (80f) is an electric motor, to whose rotor shaft the central bevel wheel (77) is fixed. Disposed on the spindle shafts (57c) are the bevel wheels (64) that are engaged with the large and central bevel wheel (77) of the electromotor. The electromotor drives the spindle shafts of all finger modules (1) together and synchronously. The synchronization chain (40b) is not necessary in this gripping mechanism. However, it provides better and uniform load distribution on the bevel wheels (64) when asymmetrical force is acting on one of the gripping fingers. Thus the synchronization chain also contributes to uniform wear of the teeth of the bevel wheel gear.

Figure 22:
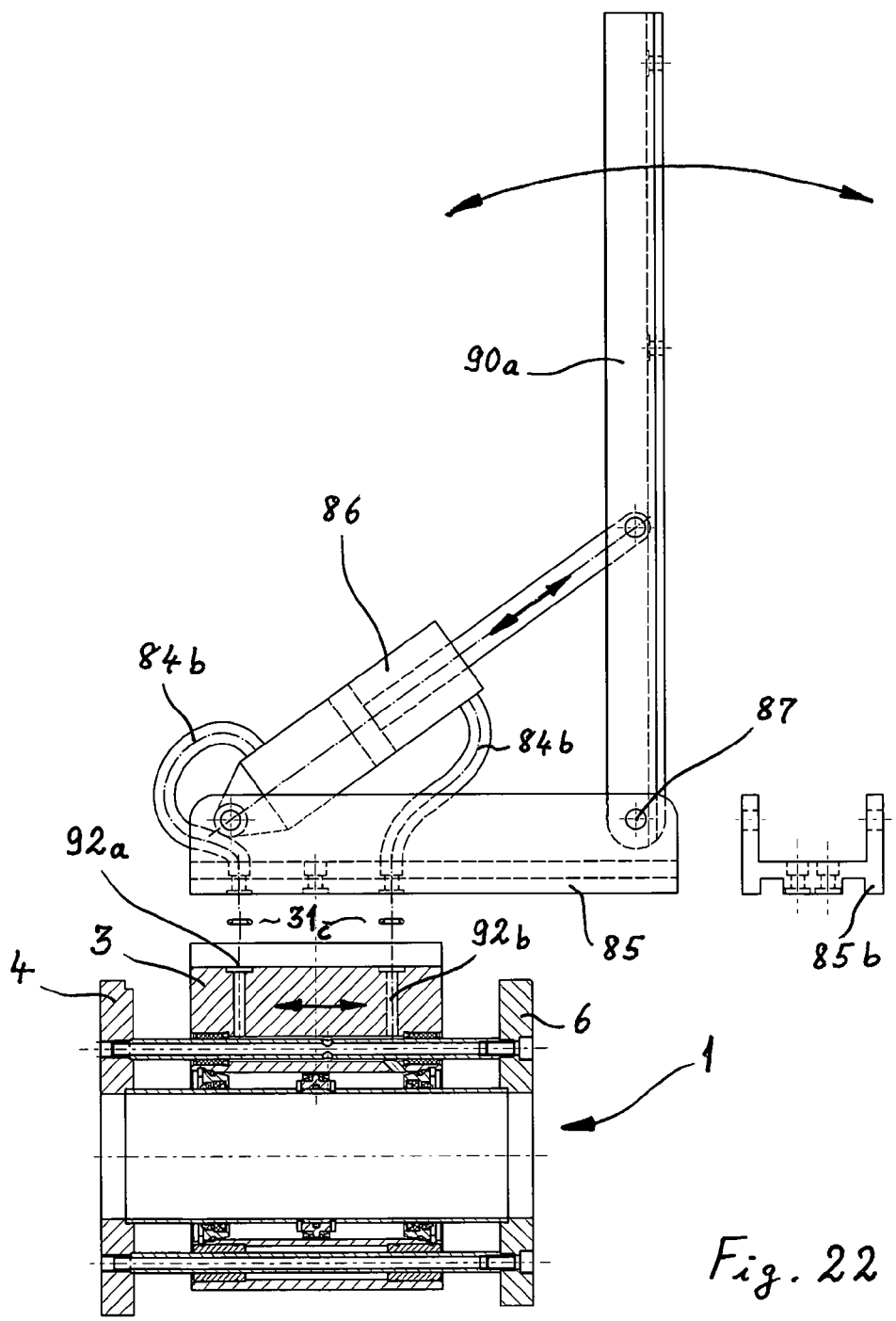
FIG. 22 depicts a finger module having an actively pivotable gripping finger on its slide.

In accordance with FIG. 22, on its outer surface the slide (3) of the pneumatically actuated slide unit has connection bores (92a, 92b) that are connected to the bores (20k, 20o) of the slide that conduct pressurizing medium. Lines (84b) conduct the pressurizing medium from these connectors either directly or via bores into the carrier (85) of the gripping finger to the actuating unit (86), which moves the gripping finger (90a) back and forth about the rotational axis (87). The seals (31c) seal the connection bores of the slide (3) against the connection bores of the carrier (85).

Figure 23:
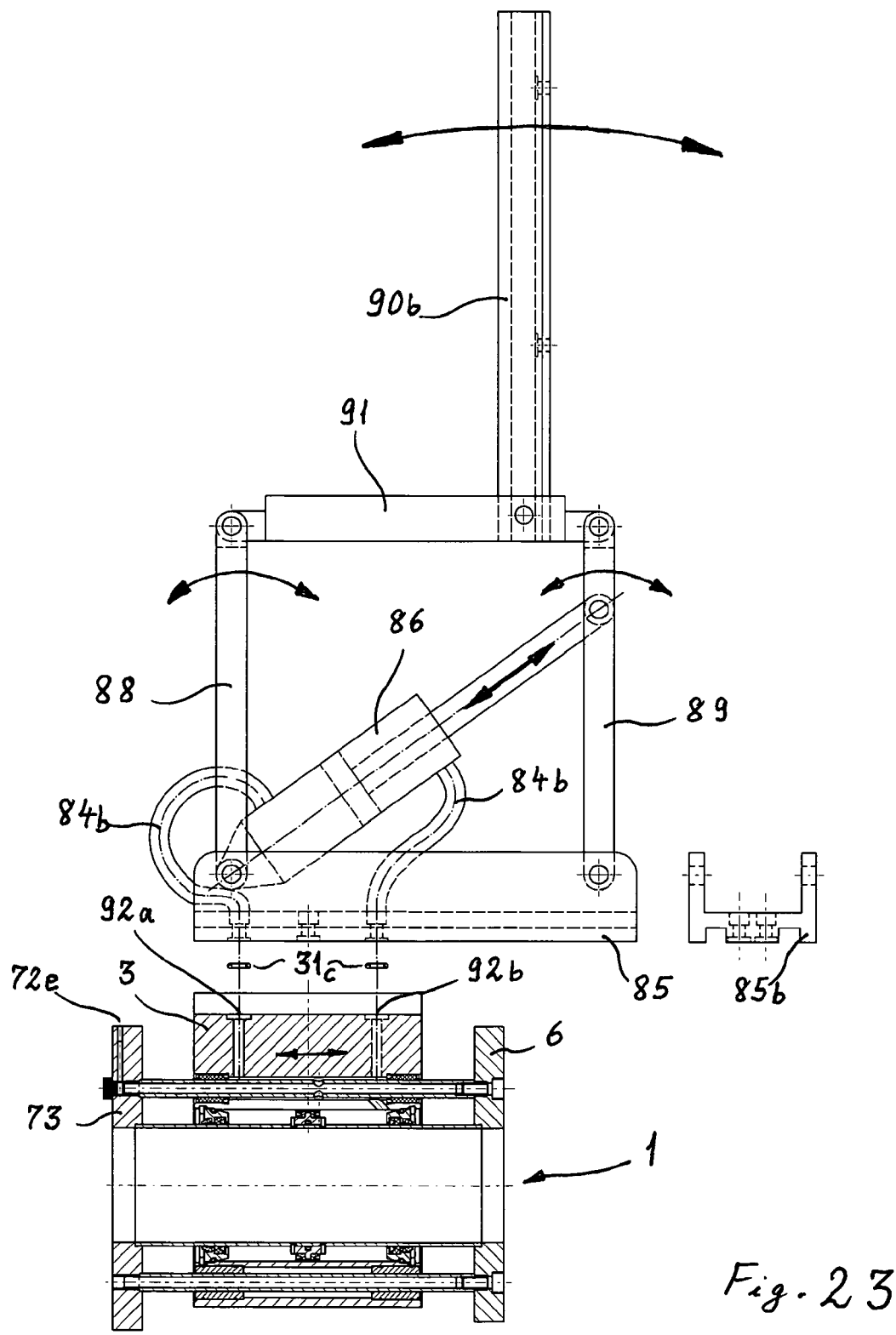
FIG. 23 depicts a pneumatically actuated finger module having a gripping finger guided as coupler of a guide gear on the slide of the finger module.
Figure 24:
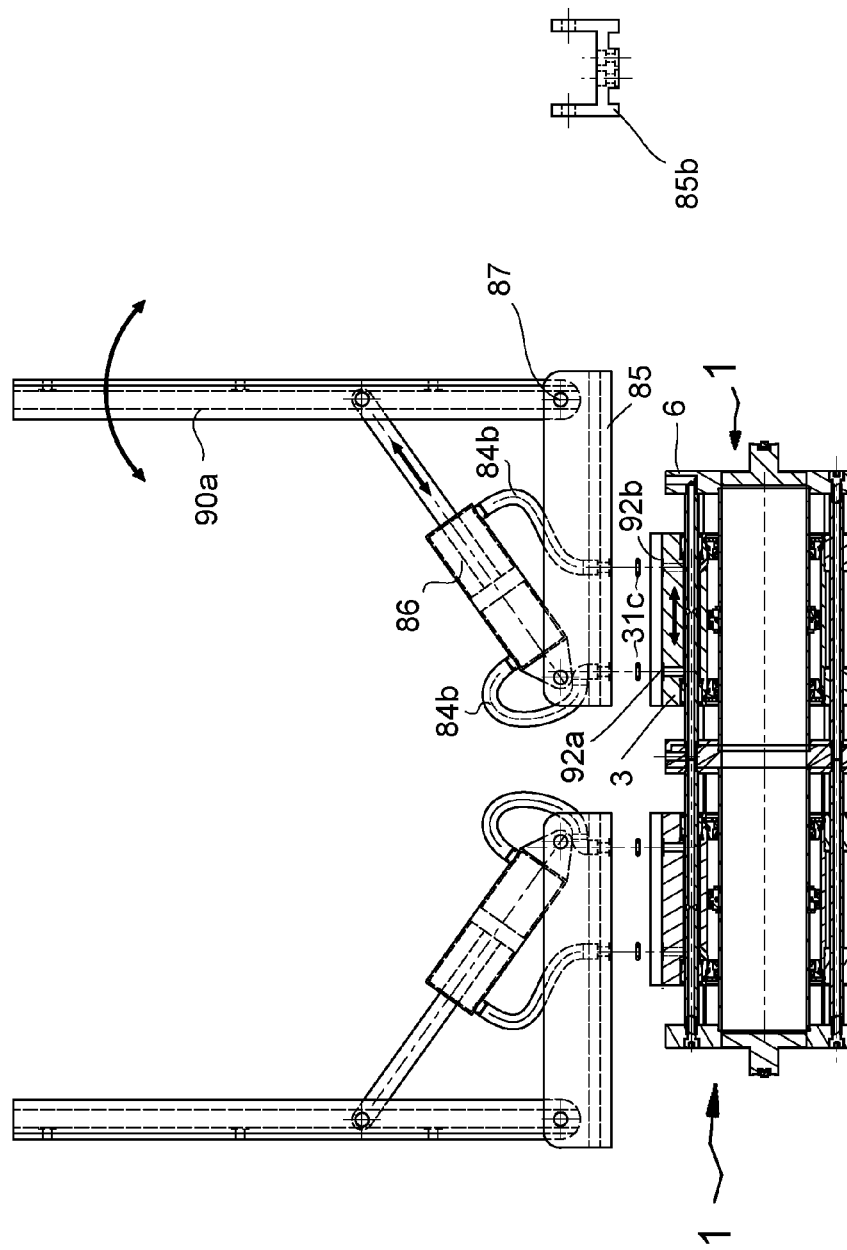
FIG. 24 depicts the finger module of FIG. 22 in combination with another, identical finger module.

In accordance with FIG. 23, the gripping finger (90b) is fixed to the coupler (91) of an articulated rectangle (85, 88, 89, 91) as a guide transmission. The guide transmission is seated on the slide (3) of the finger module (1). With its two ends, cylinder and piston rod, the pressurizing medium-actuated actuating unit (86) engages at two arms (88, 89) or (85, 89) of the guide transmission and imparts to the gripping finger an additional movement or a greater stroke, while the slide moves in the one or other direction. The carrier (85) of the gripping finger (90b) and the guide transmission (85, 88, 89, 91) is profiled (85b) such that it fits in a positive fit into the profile grooves of the slide (3) at different locations and can be fixed. The seals (31c) seal the connection bores of the carrier (85) against the connection bores (92a, 92b) of the slide (3).

The features of the invention disclosed in the description, drawings, and claims may be significant, both individually and also in any desired combination, for realizing the invention.

All disclosed features are essential to the invention.

The invention claimed is:

1. A gripping mechanism for robots, machines, or handling devices, comprising:
   a first finger module that comprises a slide unit, the slide unit carrying, directly or indirectly, a first gripping finger; and
   a different stationary or movable second gripping finger;
   wherein the first gripping finger works counter to the different stationary or movable second gripping finger;
   the slide unit comprising:
      a housing; and
      a slide carrying, directly or indirectly, the first gripping finger;
   the housing comprising:
      an at least four-sided closed frame having two end faces; and
      a plurality of guide rods on which the slide is slidable between the two end faces of the frame, the slide being borne on the guide rods, the plurality of guide rods being arranged parallel to one another such that the axes of the guide rods form a polygon, and being pre-stressed with tension between the two end faces of the frame;
   the second gripping finger being carried, directly or indirectly, by a slide of a slide unit of a second finger module or by a flange, to which the first finger module is connected directly or indirectly.

2. A gripping mechanism in accordance with claim 1, wherein the plurality of guide rods are arranged parallel to one another cylindrically.

3. A gripping mechanism in accordance with claim 1, wherein the housing of the slide unit has a fifth side as a bottom plate, which fifth side engages in a positive fit in the frame, and wherein the guide rods clamp all parts of the housing against one another in a dimensionally stable manner.

4. A gripping mechanism in accordance with claim 1, wherein, disposed between the two end faces of the frame in the middle of the guide rods, is an element, a rod, a shaft, or a tube, that with its shoulders is inserted in a positive fit into the two end faces of the frame and limits in a defined manner the bowing and the stress of the end faces that are caused by the guide rods.

5. A gripping mechanism in accordance with claim 4, wherein, disposed between the two end faces of the frame in the middle of the guide rods, is a tube clamped between the two end faces of the frame that acts as a piston tube of a pneumatic or hydraulic drive.

6. A gripping mechanism in accordance with claim 5, wherein the piston tube is designed with two halves and clamps the piston ring between its halves in a positive fit.

7. A gripping mechanism in accordance with claim 1, wherein the slide of the slide unit is produced from an extrusion profile with a longitudinally profiled surface, a large bore in the center, and a plurality of smaller bores arranged in a cylindrical shape and coaxial with the large bore.

8. A gripping mechanism in accordance with claim 7, wherein the central bore of the slide reduces weight or receives a pneumatic, hydraulic, or electromotive drive.

9. A gripping mechanism in accordance with claim 7, wherein, disposed in the central bore of the slide is a spindle nut of a spindle drive, a spindle shaft of which is rotatably clamped between the two end faces of the frame and driven.

10. A gripping mechanism in accordance with claim 7, wherein, disposed in the central bore of the slide is an electromotor with a hollow rotor, the hollow rotor of which forms the spindle nut of a spindle drive, a spindle shaft of which is securely clamped between the two end faces of the frame.

11. A gripping mechanism in accordance with claim 1, wherein
   the slide has a plurality of small bores; and
   the guide rods are laterally guided both in the end faces of the frame, and at an input and output of the plurality of small bores of the slide, are screwed in the one end face immovably fixed, and are screwed in the other end face with axial clearance.

12. A gripping mechanism in accordance with claim 11, wherein the guide rods are also laterally guided in a center of the small bores of the slide.

13. A gripping mechanism in accordance with claim 1, wherein the slide is driven or synchronized with a traction device, ribbon, belt, or chain that runs through two bores of the slide and is fixed to the slide in one of the two bores.

14. A gripping mechanism in accordance with claim 13, wherein the traction device is tightened, guided, and reversed, and the position of the slide is precisely adjusted, via a reverse and guide part that is centered in the outer end face of the frame using a cylindrical part and is secured against rotation in a longitudinal groove, and that is axially displaced by at least one tension and adjusting ring.

15. A gripping mechanism in accordance with claim 14, wherein the reverse and guide part has a double groove with a center bar for a drive and synchronization chain.

16. A gripping mechanism in accordance with claim 1, wherein the first gripping finger is pivotably fixed, or is fixed as a coupler of a guide transmission, to a carrier that is seated on the slide of the slide unit.

17. A gripping mechanism in accordance with claim 1 further comprising at least one additional movable gripping finger, wherein the at least one additional movable gripping finger works counter to the first or second gripping finger and is carried, directly or indirectly, by a slide of a slide unit of at least one additional finger module to which the first finger module is connected directly or indirectly.

18. A gripping mechanism for robots, machines, or handling devices, comprising:
 a first finger module that comprises a slide unit, the slide unit carrying, directly or indirectly, a first gripping finger; and
 a different stationary or movable second gripping finger;
 wherein the first gripping finger works counter to the different stationary or movable second gripping finger;
 the slide unit comprising:
  a housing; and
  a slide carrying, directly or indirectly, the first gripping finger;
 the housing comprising:
  an at least four-sided closed frame having two end faces; and
  a plurality of guide rods on which the slide is slidable between the two end faces of the frame, the slide being borne on the guide rods, the plurality of guide rods being arranged parallel to one another, and being pre-stressed with tension between the two end faces of the frame;
 wherein one of the end faces of the slide unit is clamped in a positive fit between a flange plate and a front plate and is pre-stressed with pressure by tension rods to form a flange case;
 the second gripping finger being carried, directly or indirectly, by a slide of a slide unit of a second finger module or by the flange case, to which the first finger module is connected directly or indirectly.

19. A gripping mechanism in accordance with claim 18, wherein the tension rods act as supply strips for a pressurizing medium between the flange and the slide unit or as reverse and guide part for a drive and synchronization element.

20. A gripping mechanism in accordance with claim 18, wherein an electromotor is placed in the flange case and drives a drive and synchronization element directly or by a toothed wheel gear or planetary gear.

21. A gripping mechanism in accordance with claim 18, wherein there are a plurality of the finger modules, and an electromotor in the flange case synchronously drives a spindle shaft of the slide units of all of the finger modules by a bevel gearing.

22. A gripping mechanism for robots, machines, or handling devices, comprising:
 a first finger module that comprises a slide unit, the slide unit carrying, directly or indirectly, a first gripping finger; and
 a different stationary or movable second gripping finger;
 wherein the first gripping finger works counter to the different stationary or movable second gripping finger;
 the slide unit comprising:
  a housing; and
  a slide carrying, directly or indirectly, the first gripping finger;
 the housing comprising a closed frame having two end faces; and
 the slide being borne within the housing between the two end faces and slidable between the two end faces of the frame,
 wherein one of the end faces of the slide unit is clamped in a positive fit between a flange plate and a front plate and is pre-stressed with pressure by tension rods to form a flange case;
 the second gripping finger being carried, directly or indirectly, by a slide of a slide unit of a second finger module or by the flange case, to which the first finger module is connected directly or indirectly.

23. A gripping mechanism in accordance with claim 22, wherein there are a plurality of the finger modules, and wherein one of the end faces of the slide unit each of the finger modules is clamped in a positive fit between the flange plate and the front plate and is pre-stressed with pressure by tension rods to form the flange case.

24. A gripping mechanism in accordance with claim 22, wherein the tension rods act as supply strips for a pressurizing medium between the flange and the slide unit.

25. A gripping mechanism in accordance with claim 22, wherein the tension rods act as a reverse and guide part for a drive and synchronization element.

26. A gripping mechanism in accordance with claim 22, wherein an electromotor is placed in the flange case and drives a drive and synchronization element directly or by a toothed wheel gear or planetary gear.

27. A gripping mechanism in accordance with claim 22, wherein there are a plurality of the finger modules, and an electromotor in the flange case synchronously drives a spindle shaft of the slide units of all of the finger modules by a bevel gearing.

28. A gripping mechanism in accordance with claim 22 further comprising a tube-shaped part located between the flange plate and the front plate that limits flexural stress of the flange plate and front plate caused by the tension rods.

29. A gripping mechanism in accordance with claim 22 further comprising at least one additional movable gripping finger, wherein the at least one additional movable gripping finger works counter to the first or second gripping finger and is carried, directly or indirectly, by a slide of a slide unit of at least one additional finger module to which the first finger module is connected directly or indirectly.

* * * * *